US008235407B2

(12) United States Patent
Cerreto et al.

(10) Patent No.: US 8,235,407 B2
(45) Date of Patent: Aug. 7, 2012

(54) WHEELCHAIR WITH ADJUSTABLE SEAT

(75) Inventors: Matthew R. Cerreto, Sullivan, OH (US); David Stitchick, Akron, OH (US); Mark Zakrajsek, Lorain, OH (US); John D. Lescher, Sheffield Village, OH (US); Judson Cummins, Westlake, OH (US)

(73) Assignee: Invacare Corporation, Elyria, OH (US)

( * ) Notice: Subject to any disclaimer, the term of this patent is extended or adjusted under 35 U.S.C. 154(b) by 257 days.

(21) Appl. No.: 12/642,464

(22) Filed: Dec. 18, 2009

(65) Prior Publication Data

US 2010/0156065 A1 Jun. 24, 2010

Related U.S. Application Data

(60) Provisional application No. 61/138,645, filed on Dec. 18, 2008.

(51) Int. Cl.
*B62J 1/00* (2006.01)

(52) U.S. Cl. .................................................... 280/250.1

(58) Field of Classification Search ............... 280/304.1, 280/250.1, 907; 297/317, 318, DIG. 4; 114/194
See application file for complete search history.

(56) References Cited

U.S. PATENT DOCUMENTS

| | | | |
|---|---|---|---|
| 2,195,428 | A | 4/1940 | Searing |
| 2,313,023 | A | 3/1943 | Ruegger |
| 3,632,076 | A | 1/1972 | Rogers, Jr. |
| 4,515,337 | A | 5/1985 | Torras |
| 4,566,551 | A | 1/1986 | Feliz |
| 4,941,709 | A | 7/1990 | Moller |
| 5,624,159 | A | 4/1997 | Celoni et al. |
| 6,032,976 | A | 3/2000 | Dickie et al. |
| 6,126,186 | A | 10/2000 | Mascari |
| 6,206,393 | B1 | 3/2001 | Mascari et al. |
| 7,007,965 | B2 | 3/2006 | Bernatsky et al. |
| 2005/0040626 | A1 | 2/2005 | Papac |
| 2007/0080030 | A1 | 4/2007 | Kramer |
| 2009/0100598 | A1 | 4/2009 | Bly et al. |

FOREIGN PATENT DOCUMENTS

| | | |
|---|---|---|
| DE | 3805630 | 7/1989 |
| WO | 2004089268 | 10/2004 |

OTHER PUBLICATIONS

International Search Report and Written Opinion from PCT/US09/068839 dated Mar. 1, 2010 including two page Communication dated May 12, 2010 regarding a typographical error in the ISA/237.

"Medtrade 2002—the 23rd year—Part 1" by Adrienne Bergen, Oct. 31, 2002—www.medrehabnetwork.com (printed from website Feb. 14, 2005) (9 pages).

(Continued)

*Primary Examiner* — Tony Winner

(74) *Attorney, Agent, or Firm* — Calfee, Halter & Griswold, LLP

(57) ABSTRACT

A wheelchair is provided for positioning and transporting patients. An exemplary embodiment of the wheelchair includes a tiltable seat frame portion and a base frame portion. The seat frame portion is generally configured to tilt relative to the base frame portion. An arcuate track adjustment portion generally permits pivotal adjustment of the focus about which the seat frame portion rotates. A seat frame adjustment portion generally permits pivotal adjustment of the seat frame portion relative to the base frame portion such that the seat frame portion maintains proper orientation with the base frame portion upon adjustment of the focus about which the seat frame portion rotates.

31 Claims, 23 Drawing Sheets

OTHER PUBLICATIONS

"HomeCare—New Products", Oct. 1, 2003—www.homecaremag.com (printed from website Dec. 10, 2004) (3 pages).

"Titanium chair sales soar as costs lighten" by Jeff Hall, www.hmenews.com/2003/05/depts/edit/pfocus.htm (printed from website Dec. 13, 2004) (5 pages).

The BUG product brochure, "The Wheelchair that Keeps on Growing and Growing . . .", PlainSense Wheelchairs, Inc., www.plainsense-wheelchairs.com (as least as early as Dec. 17, 2007) (2 pages).

Quickie IRIS product brochure, iris, intelligent rotation in space, Sunrise Medical Inc., 932088 Rev. A, 2003 (2 pages).

Quickie IRIS, "The Product that Revolutionized the Industry" product brochure, Sunrise Medical Inc., 932088, Rev. E, 2005 (2 pages).

Solara Wheelchair Parts Catalog, Invacare Corp., Form No. 99-128, 1999 (28 pages).

Solara/Spree GT Owner's Operator and Maintenance Manual, Invacare Corp., Part No. 1125027, Rev. A, Sep. 2004 (91 pages).

Solara/Spree GT Owner's Operator and Maintenance Manual, Invacare Corp., Part No. 1125027, Rev. C, Sep. 2007 (100 pages).

Solara and Solara Limited Service Manual, Invacare Corp., Part No. 1085787, Rev. E, Jun. 2004 (60 pages).

Solara and Solara Limited Owner's Operator and Maintenance Manual, Invacare Corp., Part No. 1080556, Rev. I, Mar. 2004 (80 pages).

Quickie Iris User Instruction Manual & Warranty, Sunrise Medical, Inc., 931134, Rev. A, Jun. 2003 (25 pages).

Solara and Solara Limited Parts Catalog, Invacare Corp., Form No. 99-128, Mar. 31, 2006 (97 pages).

Quickie IRIS Ordering Guide, Sunrise Medical Inc., 923019, Rev. A, Jul. 2003 (4 pages).

Quickie IRIS Parts Manual Supplement, Sunrise Medical Inc., Oct. 2005 (24 pages).

WHEELCHAIR WITH ADJUSTABLE SEAT

CROSS REFERENCE TO RELATED APPLICATION

This case claims priority to, and any other benefit of, U.S. Provisional Patent Application Ser. No. 61/138,645, filed on Dec. 18, 2008 and entitled WHEELCHAIR, which is hereby incorporated by reference in its entirety.

FIELD OF THE INVENTION

The invention of the present application relates to a wheelchair. More specifically, one exemplary embodiment of the invention described in the present application relates to a tilting wheelchair for positioning and transporting patients.

BACKGROUND

Tilting wheelchairs are generally used to position a patient in various angular positions that may be beneficial to the patient's health and daily routine. For example, tilting wheelchairs may relieve pressure on various portions of the patient's body or assist with proper digestion and respiration. Traditional tilting wheelchairs adjust for the size of the occupant by varying the seat depth. This adjustment potentially moves the center of gravity of the occupant away from the focus of the rotating seating system. As such, the seating system is difficult to manually tilt.

SUMMARY

A wheelchair is provided for positioning and transporting patients. An exemplary embodiment of one such wheelchair includes a tiltable seat frame portion and a base frame portion. The seat frame portion may have a bottom member and an arcuate support member attached to the bottom member by a first pivotal attachment and by a seat frame adjustment portion. The seat frame adjustment portion may allow for pivotal adjustment of the bottom member about the first pivotal attachment relative to the arcuate support member. The base frame portion may have a base member and an arcuate track member attached to the base member by a second pivotal attachment and by an arcuate track adjustment portion. The arcuate track portion may allow for pivotal adjustment of the arcuate track member about the second pivotal attachment relative to the base member. The seat frame portion is generally configured to tilt relative to the base frame portion. The arcuate track adjustment portion generally permits pivotal adjustment of the focus about which the seat frame portion rotates. The seat frame adjustment portion generally permits pivotal adjustment of the seat frame portion relative to the base frame portion such that the seat frame portion maintains proper orientation with the base frame portion upon adjustment of the focus about which the seat frame portion rotates.

Embodiments of a tilt release assembly that may be used with the disclosed wheelchairs are also disclosed by the present application. Such a tilt release assembly may be attached to a back member of the seat frame portion. The tilt release assembly may comprise a lever block and a release lever pivotally connected to the lever block. The release lever may be operatively connected by a cable to a locking assembly of the seat frame portion. The cable may be configured to transmit a force applied to the release lever to release the locking assembly such that the seat frame portion may tilt relative to the base frame portion. The cable may be attached to the release lever at a bottom portion of the tilt release assembly such that the cable may be attached to the locking assembly without bending.

The wheelchair may also comprise a floor engagement mechanism attached to the base frame portion. The floor engagement mechanism is generally configured to selectively engage the floor or support surface to inhibit the rolling motion of a set of drive wheels of the wheelchair. The floor engagement mechanism may be configured to at least partially lift the drive wheels of the wheelchair off the floor. The floor engagement mechanism may also be configured to permit the wheelchair to be rolled in a direction not limited by the drive wheels.

DESCRIPTION OF EMBODIMENTS

The wheelchair of the present application includes a tiltable seat. The tiltable seat may be utilized on any conventional or typical wheelchair such as a powered wheelchair or manual wheelchair.

Figure 1A:
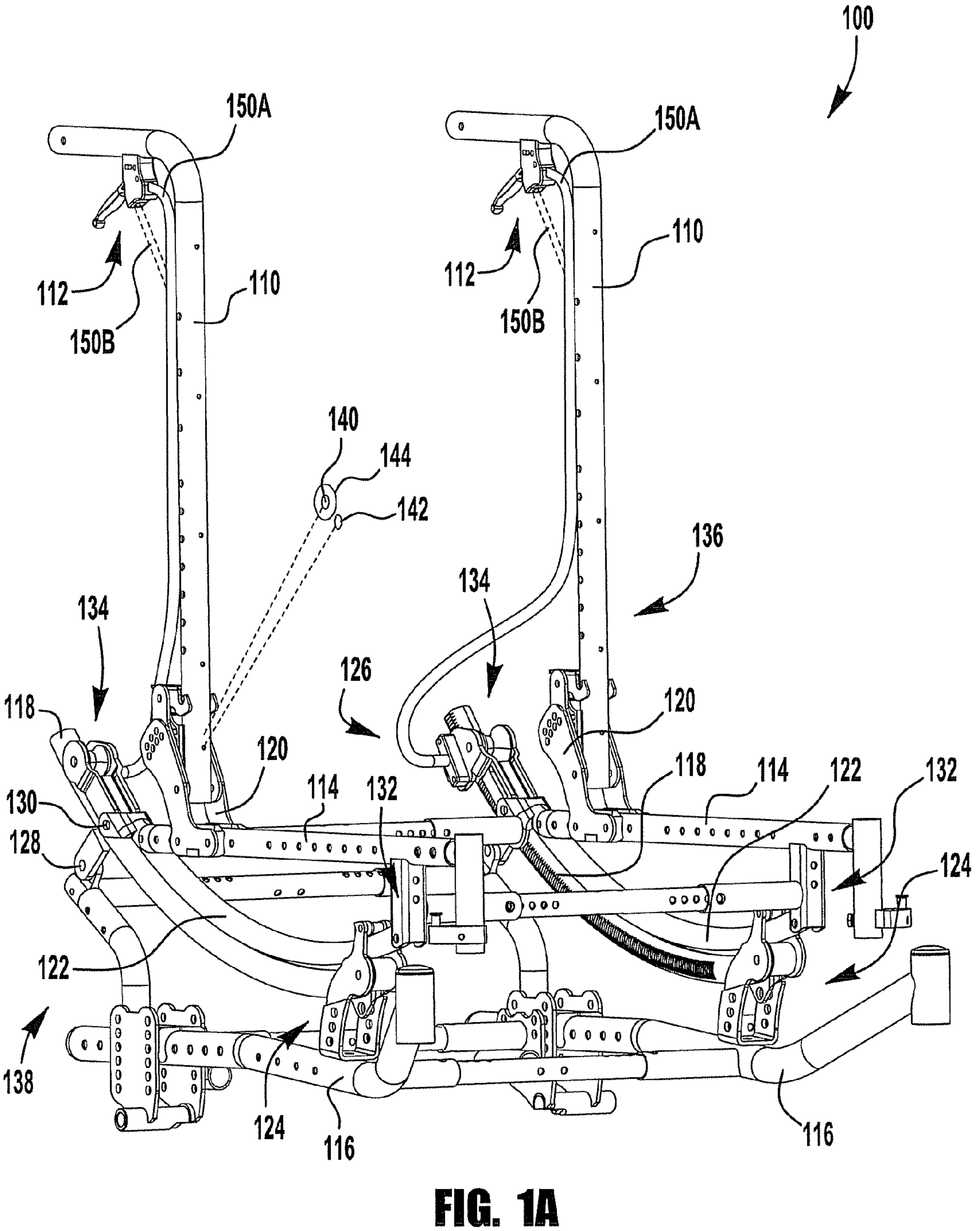
FIG. 1A is a perspective view of one embodiment of a wheelchair frame in a configuration for a large occupant.
Figure 1B:
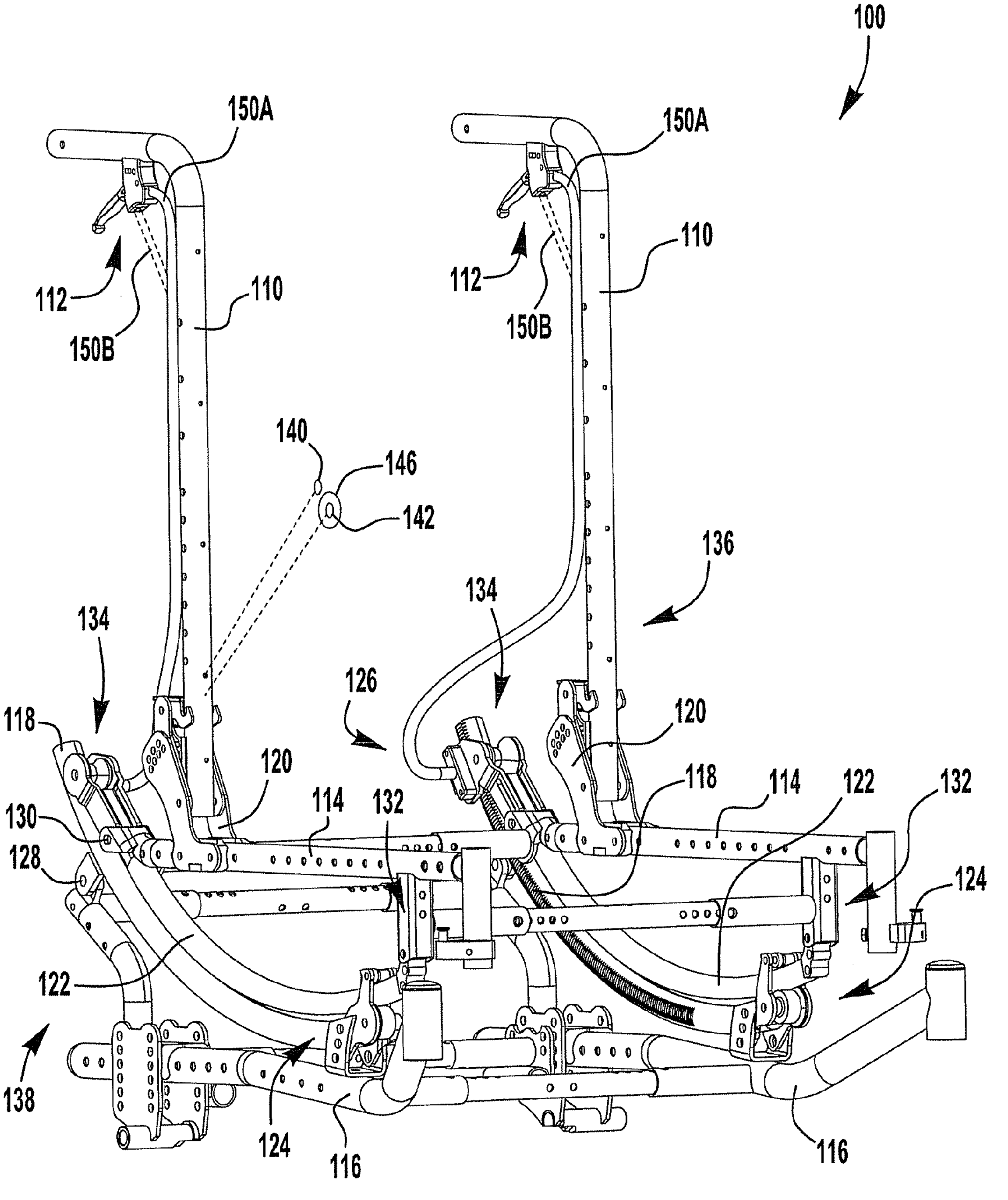
FIG. 1B is a perspective view of one embodiment of a wheelchair frame in a configuration for a small occupant.
Figure 1C:
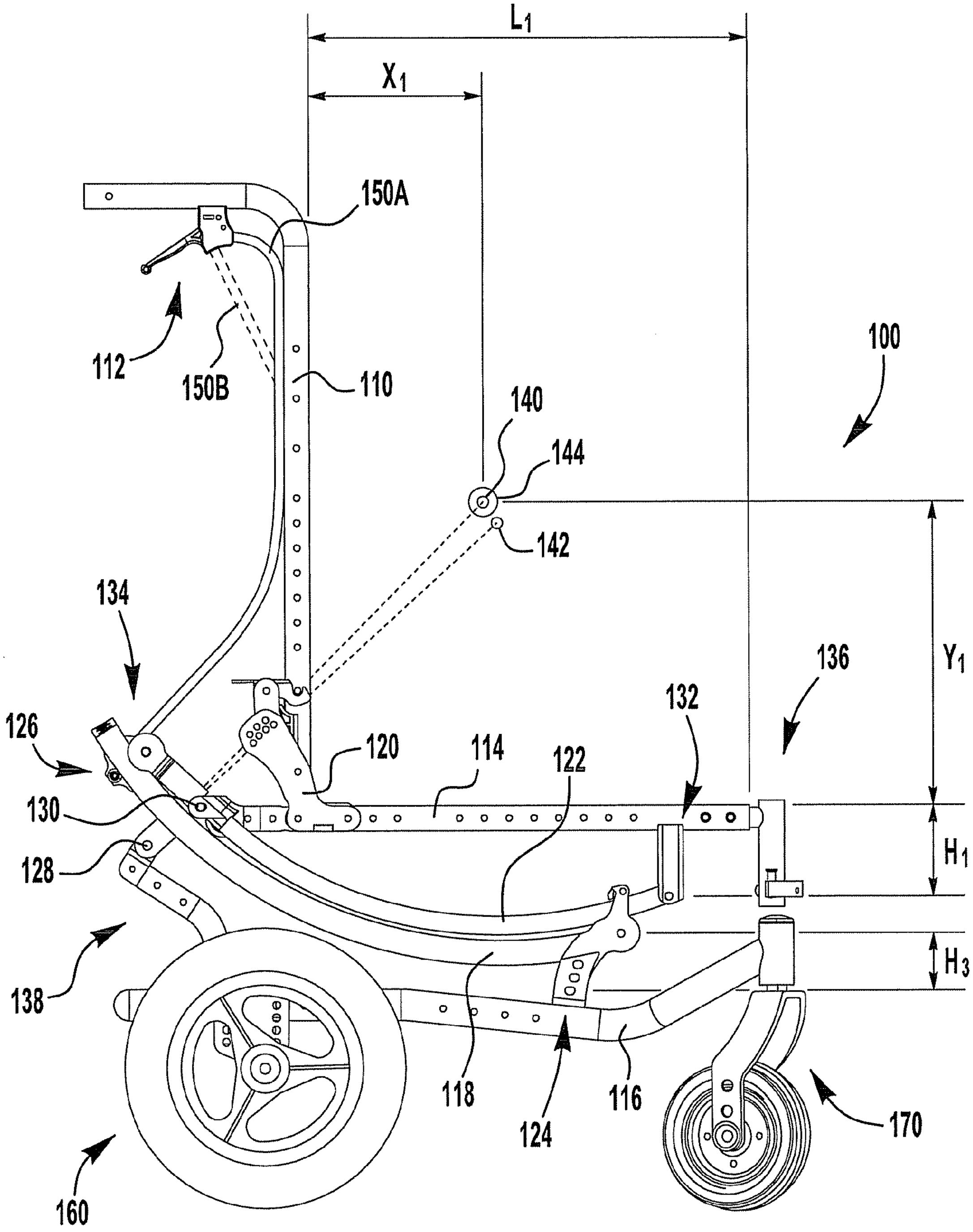
FIG. 1C is a right side view of one embodiment of a wheelchair frame in a configuration for a large occupant.
Figure 1D:
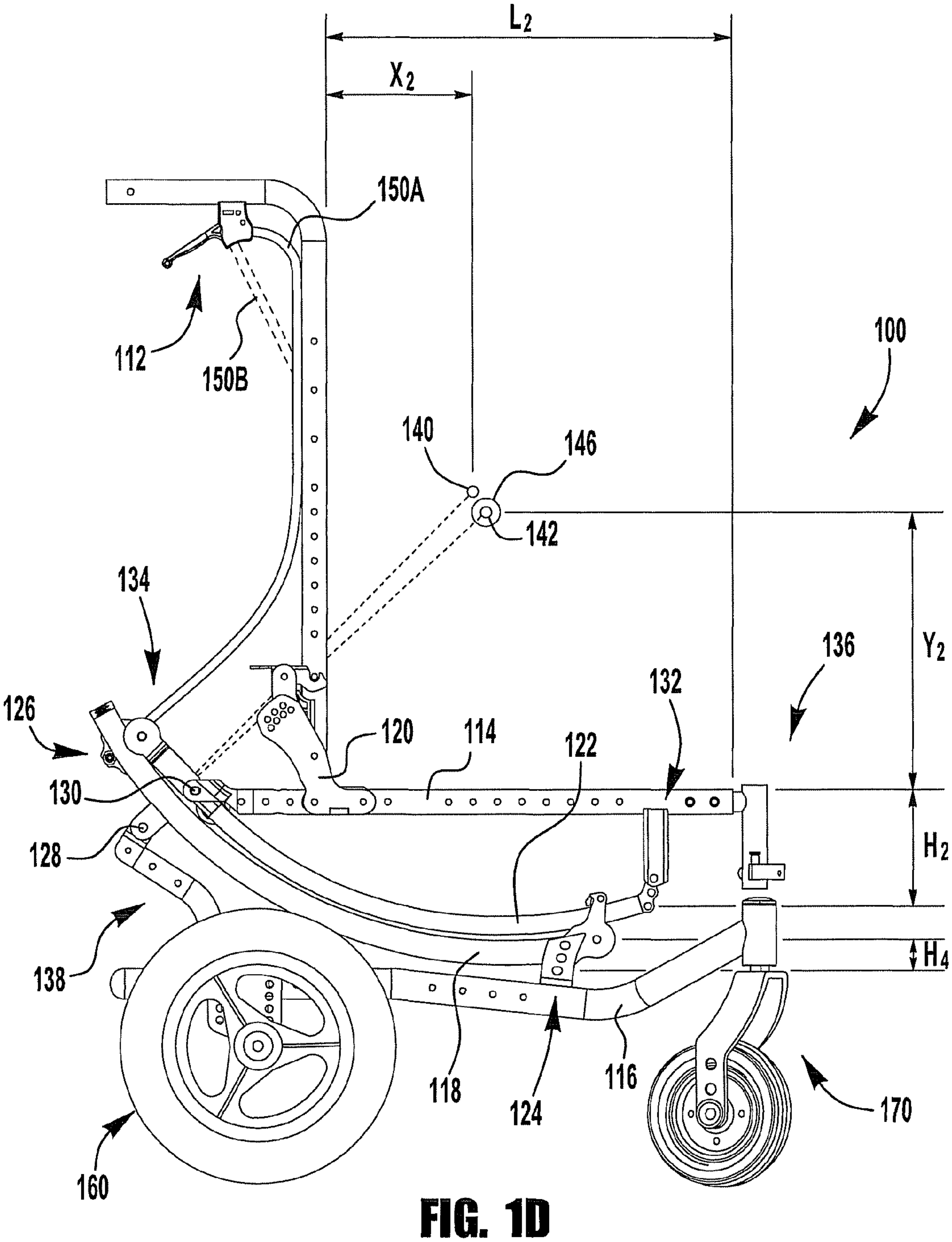
FIG. 1D is a right side view of one embodiment of a wheelchair frame in a configuration for a small occupant.

FIGS. 1A and 1B illustrate perspective views of one embodiment of a wheelchair frame 100. FIGS. 1C and 1D illustrate right side views of wheelchair frame 100 having a drive wheel assembly 160 and a caster assembly 170. Wheelchair frame 100 includes a seat frame portion 136 and the base frame portion 138. Seat frame portion 136 includes two back members or canes 110, two bottom members 114, and two arcuate support members 122. Each back member 110 is adjustably attached to a bottom member 114 by a bracket 120. Each arcuate support member 122 is pivotally attached to a bottom member 114 by a bracket at a pivot point 130, i.e., a first pivotal attachment. Further, each arcuate support member 122 is adjustably attached to a bottom member 114 by a seat frame adjustment portion 132. Attached to each arcuate support member 122 is a roller assembly 134 and a locking assembly 126. Each locking assembly 126 is operatively connected by a cable 150 to a tilt release assembly 112 attached adjacent to a handle of each back member 110. Cables 150A or 150B transmit a force applied to a lever of tilt release assembly 112 to release locking assembly 126 such that seat frame portion 136 may tilt relative to base frame portion 138. The locking assembly 126 may be any suitable assembly for selectively locking the seat frame portion 136 relative to the base frame portion 138. For example, the locking assembly 126 may comprise at least one engagement member that engages teeth on the arcuate track member 118 to selectively lock the seat frame portion 136 relative to the base frame portion 138. Thus, a force applied to the lever of tilt release assembly 112 will release the engagement member such that seat frame portion 136 may tilt relative to base frame portion 138. Other suitable assemblies may include a brake or clutch assembly.

Base frame portion 138 includes two base members 116 and two arcuate track members 118. Each arcuate track member 118 is pivotally attached to a base member 116 by a bracket at a pivot point 128, i.e., a second pivotal attachment. Further, each arcuate track member 118 is adjustably attached to base member 116 by an arcuate track adjustment portion 124. Drive wheel assembly 160 and caster assembly 170 are operatively connected to base frame portion 138.

Figure 2A:
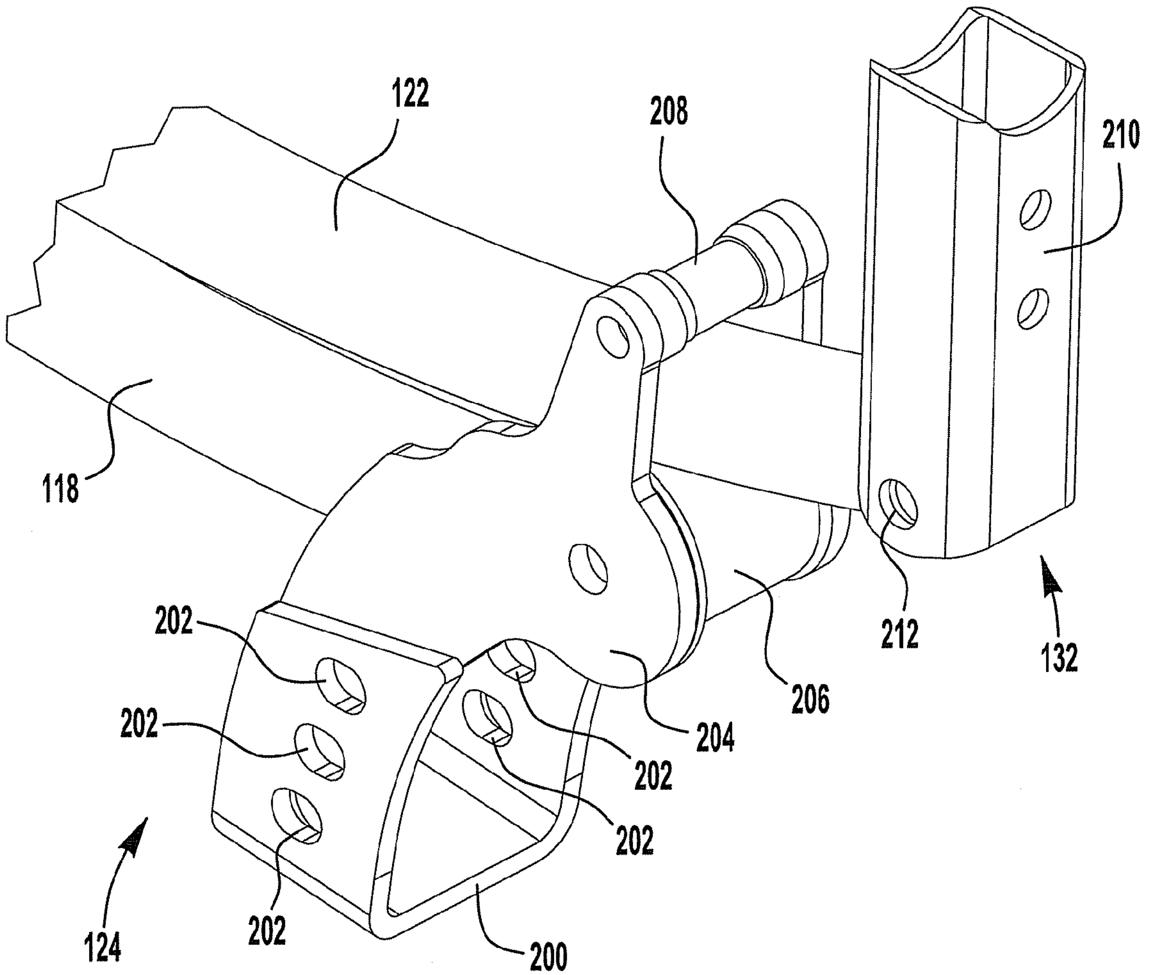
FIGS. 2A and 2B are perspective views of one embodiment of a seat frame adjustment portion and an arcuate track adjustment portion of a wheelchair frame, as shown in FIGS. 1A and 1C.
Figure 2B:
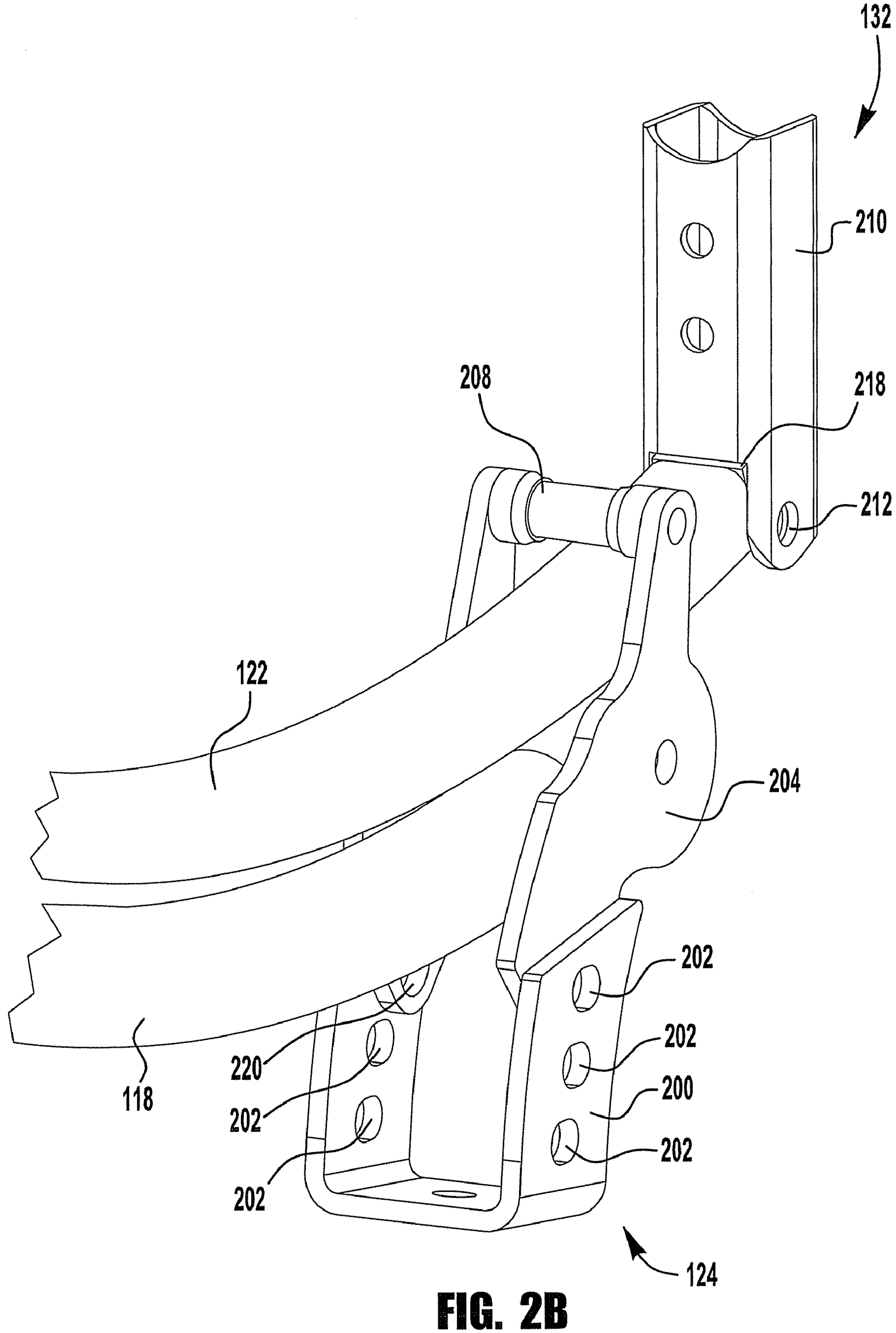
Figure 2C:
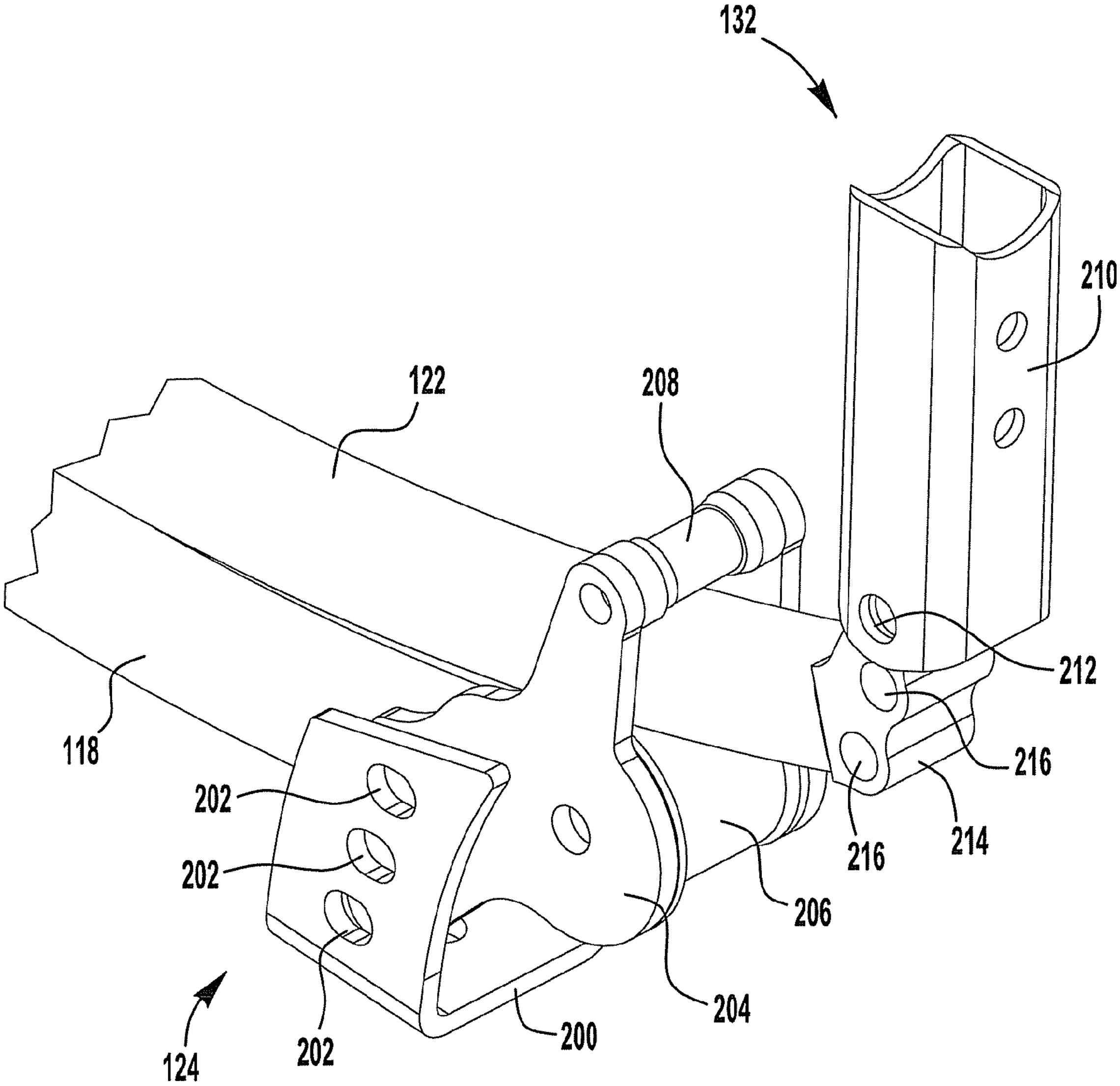
FIGS. 2C and 2D are perspective views of the seat frame adjustment portion and the arcuate track adjustment portion of FIGS. 2A and 2B, in a different position.
Figure 2D:
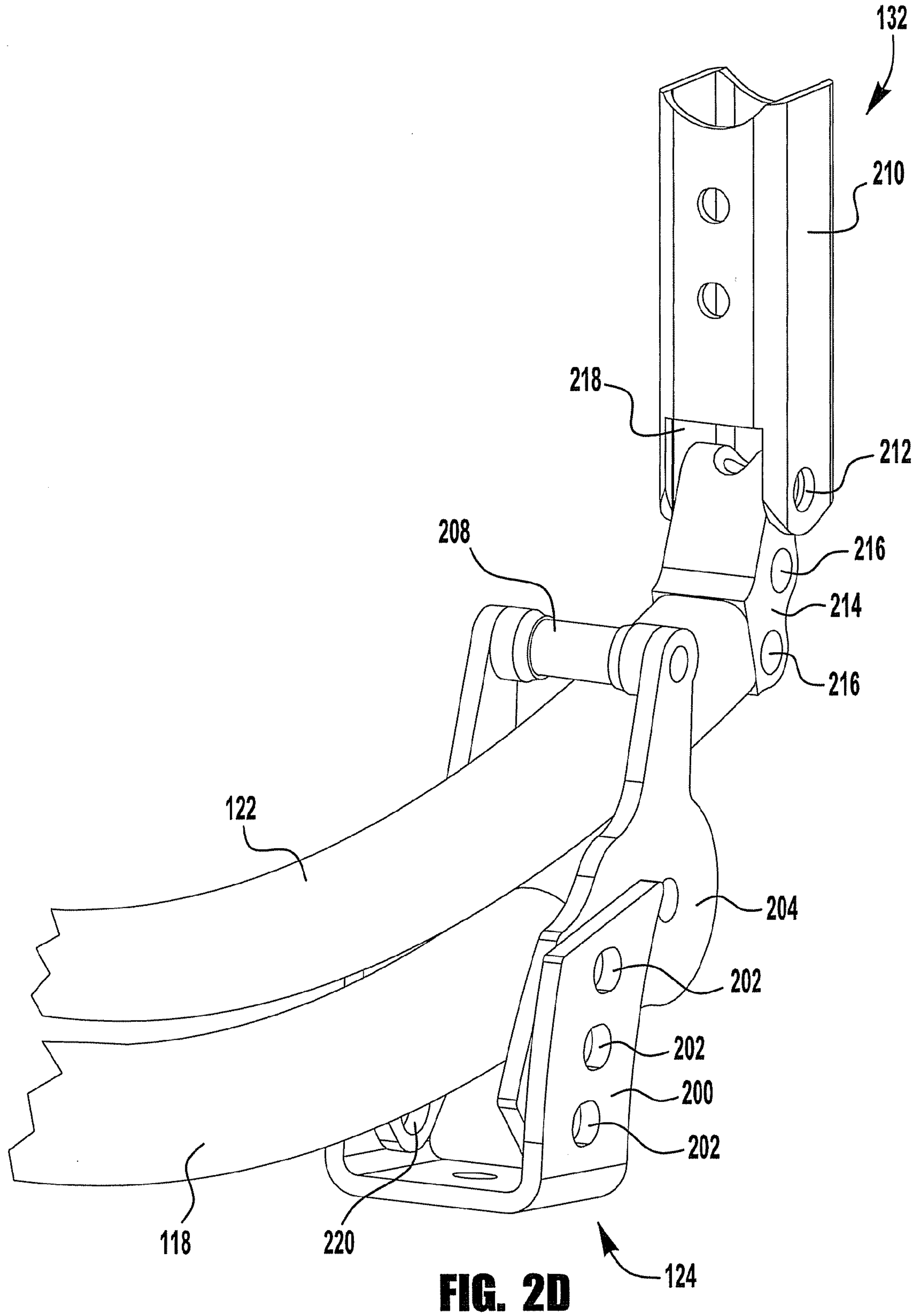

FIGS. 2A-2D. illustrate perspective views of one embodiment of seat frame adjustment portion 132 and arcuate track adjustment portion 124. Seat frame adjustment portion 132 includes a top adjustment member 210 connected to, or integrally formed with, bottom member 114 (FIGS. 1A-1D) and a bottom adjustment member 214 connected to, or integrally formed with, arcuate support member 122 (FIGS. 2C and 2D). As shown, top adjustment member 210 is tubular; however, other various suitable configurations may be used, such as a one or more plates, a U-shaped bracket, clevis, or the like. Further, bottom adjustment member 214 is shown as a unitary piece of material comprising apertures; however, other various suitable configurations may be used, such as a bracket, clevis, tube, one or more plates, or the like. Top adjustment member 210 and bottom adjustment member 214 may be connected to bottom member 114 and arcuate support member 122, respectively, by any suitable method such as, for example, with a weld, a fastener, an adhesive, or the like. Top adjustment member 210 and bottom adjustment member 214 may also include other cross sectional geometries such as, for example, circular, elliptical, polygonal, or triangular.

Top adjustment member 210 is movably connected to bottom adjustment member 214. Top adjustment member 210 includes at least one aperture 212 and an opening 218. Bottom adjustment member 214 includes apertures 216 designed to substantially align with aperture 212 such that top adjustment member 210 may be connected with a fastener (not shown) to bottom adjustment member 214 in various positions. Any suitable removable fastener such as, for example, a pin, a bolt, or a screw, may be used to connect top adjustment member 210 to bottom adjustment member 214.

Arcuate track adjustment portion 124 includes a track adjustment member 200 connected to, or integrally formed with, base member 116 (FIGS. 1A-1D) and a roller bracket 204 connected to, or integrally formed with, arcuate track member 118 (FIGS. 1A-1D). As shown, track adjustment member 200 is a clevis; however, other various suitable configurations may be used, such as a tube, U-shaped bracket, one or more plates, or the like. Track adjustment member 200 and roller bracket 204 may be connected to base member 116 and arcuate track member 118, respectively, by any suitable method such as, for example, with a weld, a fastener, an adhesive, or the like.

Track adjustment member 200 is movably connected to roller bracket 204. Track adjustment member 200 includes apertures 202 designed to substantially align with at least one aperture 220 in roller bracket 204 such that roller bracket 204 may be connected with a fastener (not shown) to track adjustment member 200 in various positions. Any suitable removable fastener such as, for example, a pin, a bolt, or a screw, may be used to connect track adjustment member 200 to roller bracket 204. In some embodiments, apertures 202 may be replaced with a continuous slot for use with a locking mechanism, for example a friction lock, to lock roller bracket 204 relative to track adjustment member 200 in an infinite number of positions. Further, an upper roller 208 and a lower roller 206 are mounted to roller bracket 204.

FIGS. 3A-3D illustrate perspective views of one embodiment of a tilt release assembly 112. Tilt release assembly 112 is attached to back member 110 and includes a lever block 306 and a release lever 304. Lever block 306 includes at least one opening 300, 302. Release lever 304 includes at least one opening 310, 312 and at least one cavity, or channel, 314. Release lever 304 is pivotally connected to lever block 306 at a pivotal connection 308. Pivotal connection 308 may be any suitable pivotal connection such as, for example, a bolt, a pin, a hinge, or a screw.

As stated, cable 150A or 150B transmit a force applied to release lever 304 to release locking assembly 126 such that seat frame portion 136 may tilt relative to base frame portion 138. FIGS. 3A-3C and 1A-1D show a cable attached to release lever 304 in two exemplary mounting locations. Cable 150A is shown attached to release lever 304 at a front portion of tilt release assembly 112. Cable 150B is shown attached to release lever 304 at a bottom portion of tilt release assembly 112. As shown in FIGS. 3C and 1A-1D, cable 150A must be bent downward to attach to release locking assembly 126. Cable 150B does not require a severe bend to attach to release locking assembly 126. It is desirable to reduce the amount of bending in the cable to prohibit breaking, crimping, and binding of the cable. The cable may be attached to release lever 304 at various suitable mounting locations to prohibit bending of the cable.

Figure 9A:
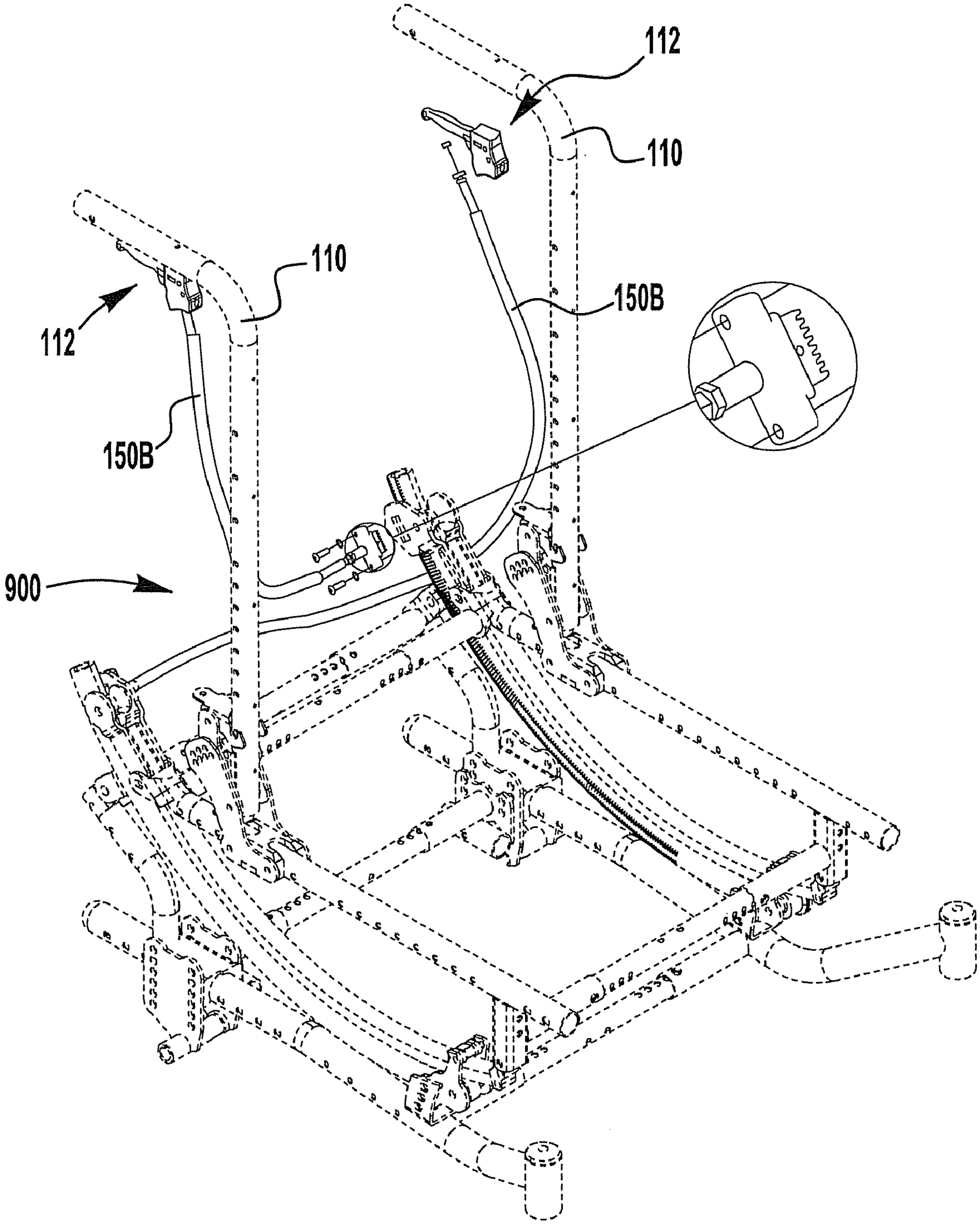
FIG. 9A is a perspective view of one embodiment of a wheelchair frame having a tilt release assembly in a first configuration.
Figure 9B:
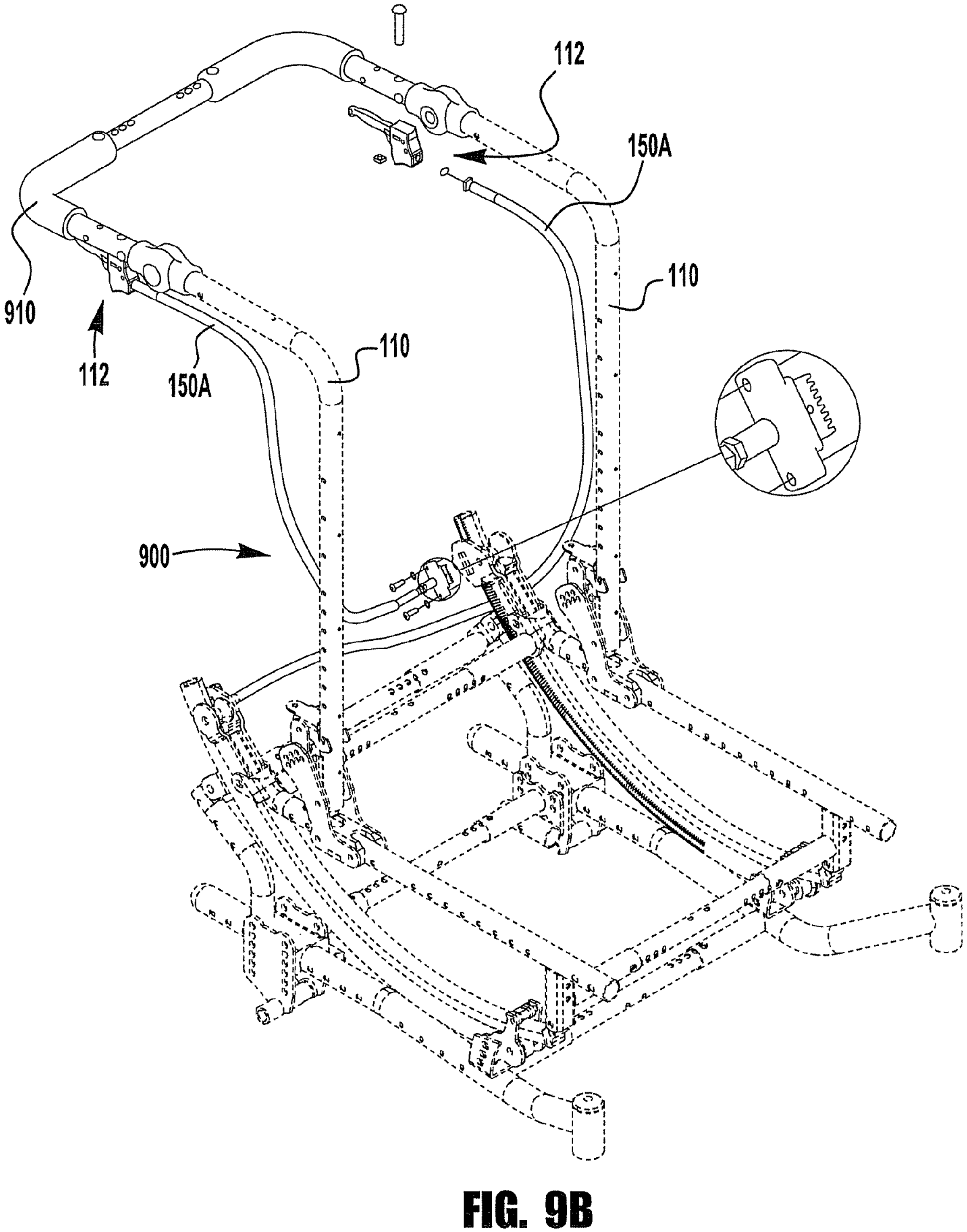
FIG. 9B is a perspective view of one embodiment of a wheelchair frame having a tilt release assembly in a second configuration.

FIGS. 9A-9B illustrate perspective views of a wheelchair frame 900 in two exemplary tilt release assembly 112 configurations. In FIG. 9A, wheelchair frame 900 is shown in a first configuration comprising tilt assemblies 112 attached to the handles of back member 110. In this configuration, cables 150B are attached to the release levers at a bottom portion of tilt release assemblies 112. In FIG. 9B, wheelchair frame 900 is shown in a second configuration comprising an extension 910 removably and adjustably attached to the handles of back member 110. In this configuration, tilt assemblies 112 are attached to extension 910 and cables 150A are attached to the release levers at a front portion of tilt release assemblies 112.

Figure 3A:
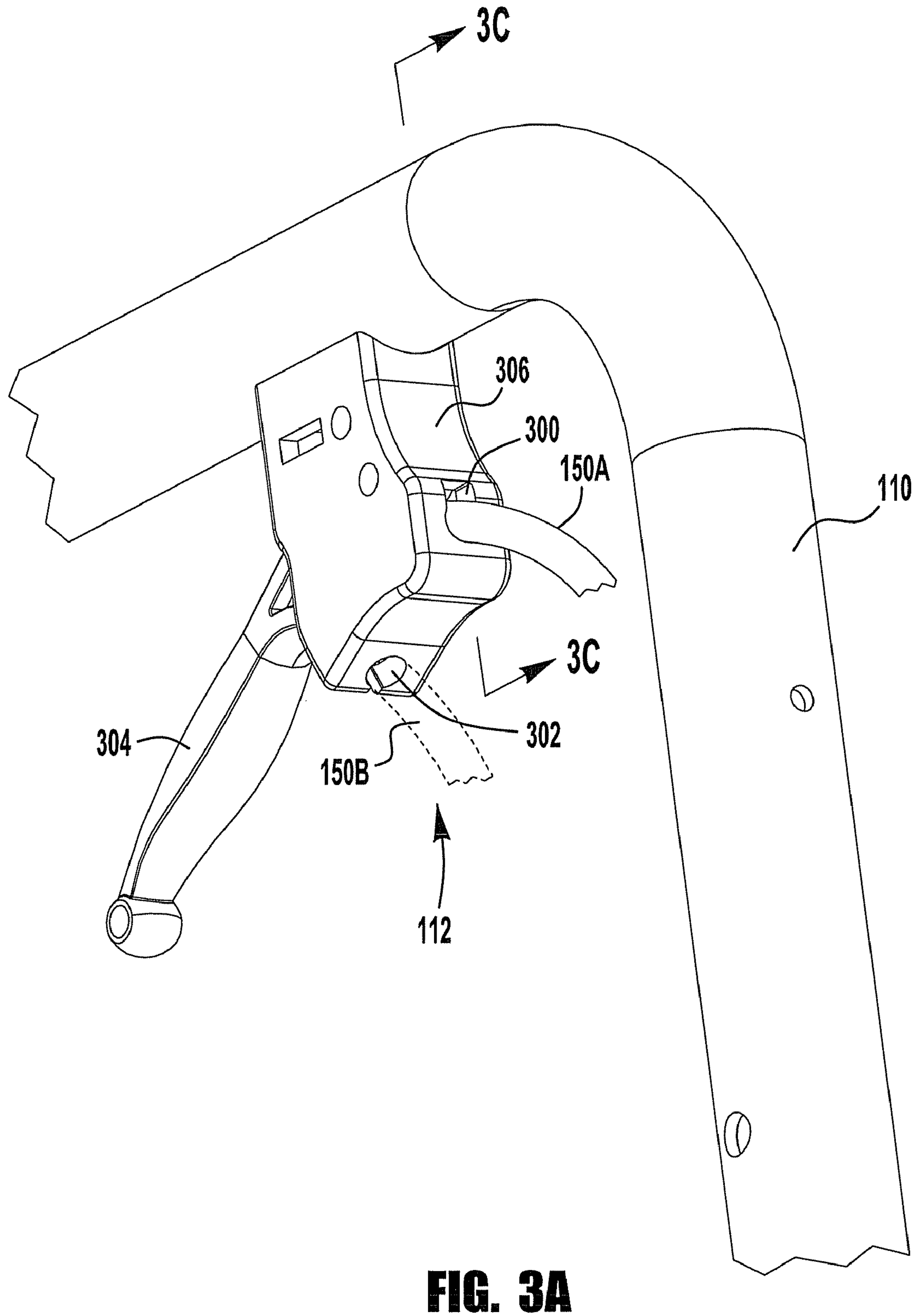
FIGS. 3A and 3B are perspective views of one embodiment of a tilt release assembly of a wheelchair frame, as shown in FIGS. 1A-1D.
Figure 3B:
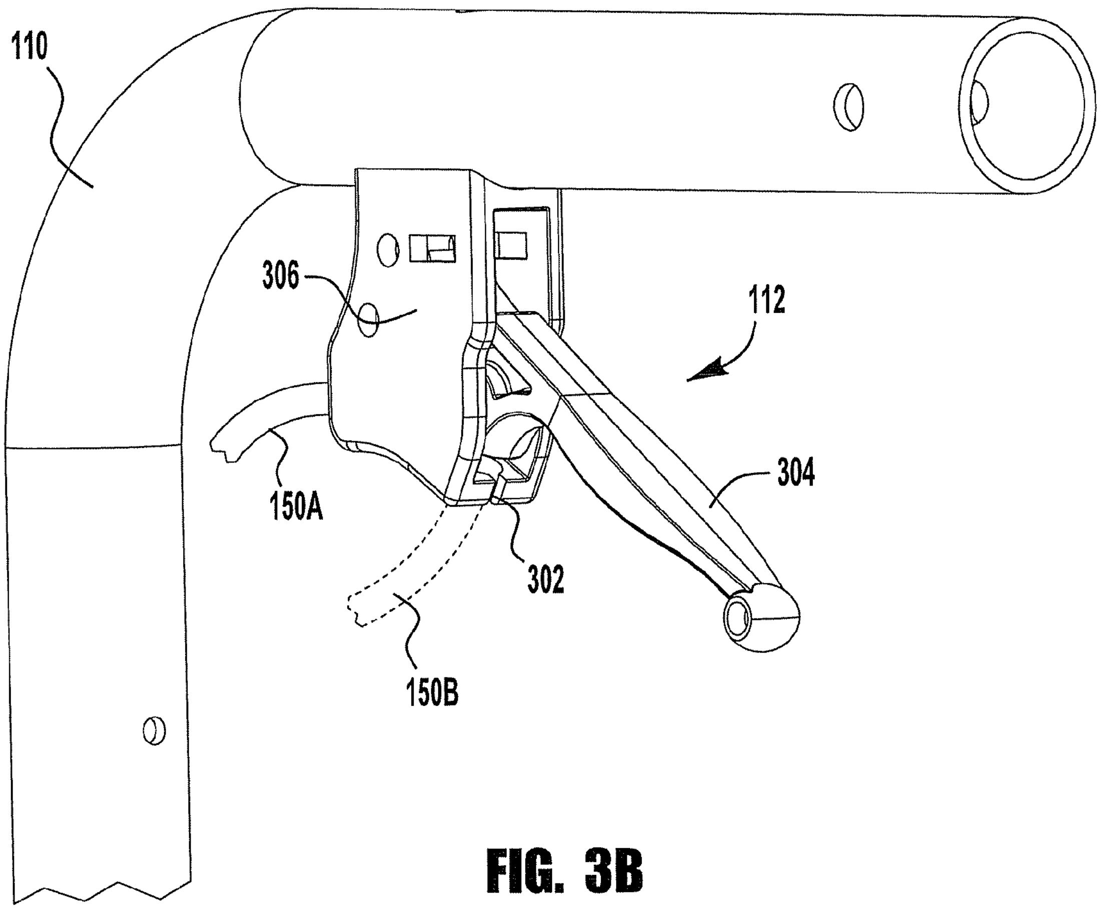
Figure 3C:
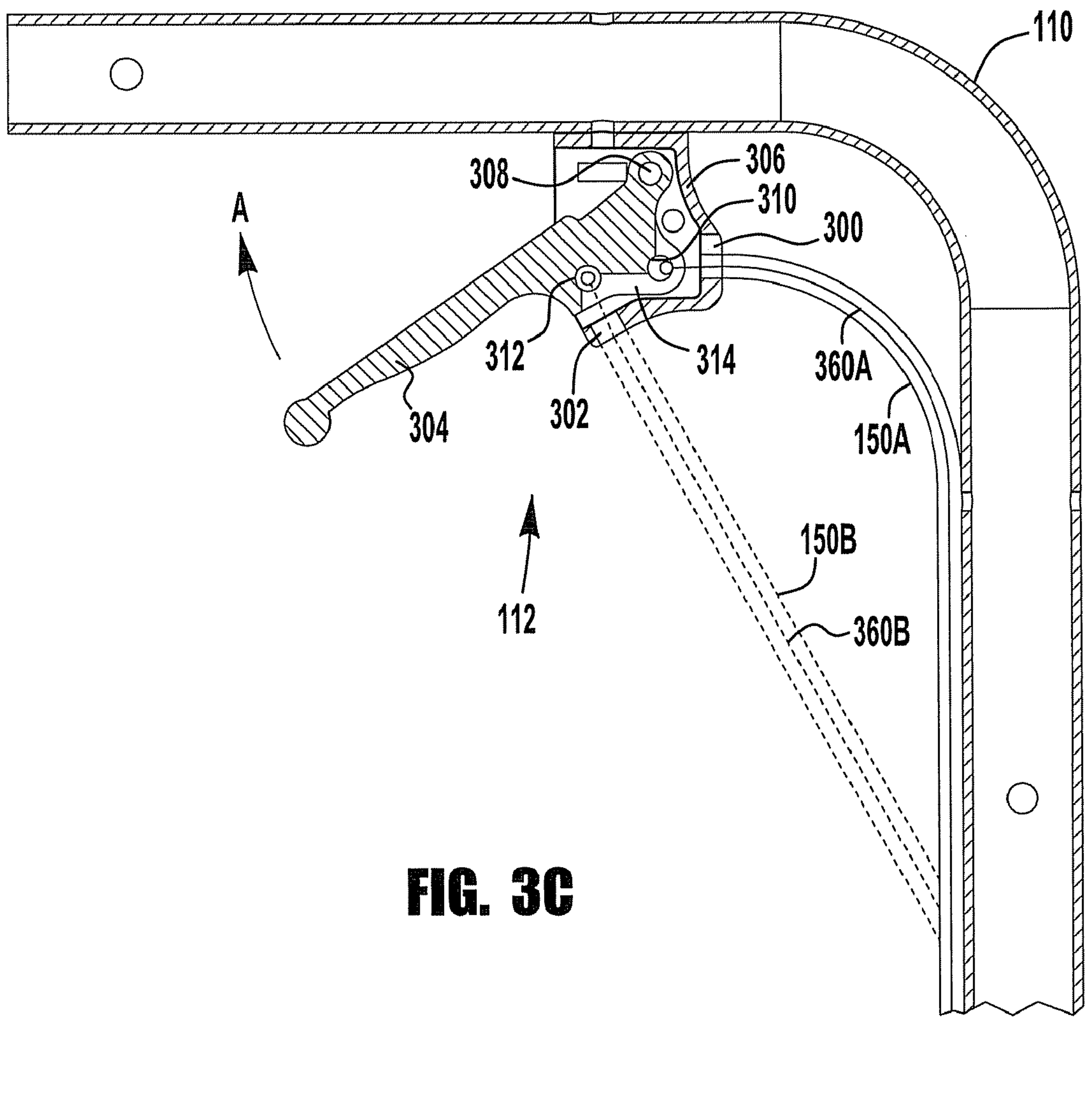
FIG. 3C is a cross sectional view of the tilt release assembly of FIGS. 3A and 3B.
Figure 3D:
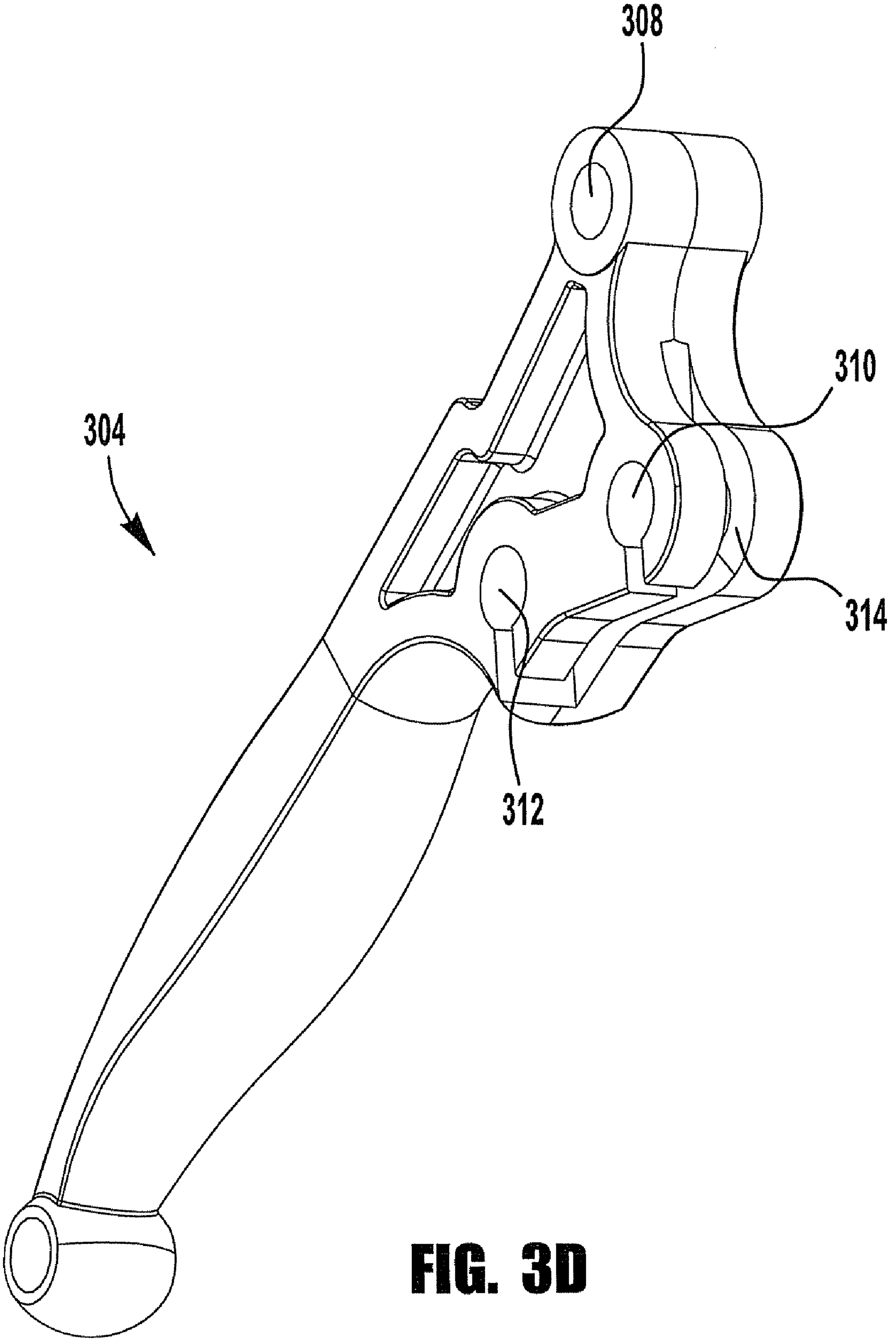
FIG. 3D is a perspective view of one embodiment of the lever of the tilt release assembly of FIGS. 3A-3C.

As shown in FIG. 3C, an end of a wire 360A of cable 150A is connected to release lever 304 at opening 310. The end of wire 360A is inserted through opening 300 in lever block 306 and into a larger portion of opening 310 (shown in FIG. 3D). A portion of wire 360A adjacent the end is inserted through opening 300 in lever block 306 and through a smaller, or notch, portion of opening 310 (shown in FIG. 3D). The end of wire 360A is held within the larger portion of opening 310 while the wire moves within cavity 314 (shown in FIG. 3D) of release lever 304. Similarly, as shown in FIG. 3C, an end of a wire 360B of cable 1508 is connected to release lever 304 via opening 312. The end of wire 360B is inserted through opening 302 of lever block 306 and into a larger portion of opening 312 (shown in FIG. 3D). A portion of wire 360B is inserted through opening 302 of lever block 306 and through a smaller, or notch, portion of opening 312 (shown in FIG. 3D). The end of wire 360B is held within the larger portion of opening 312 while the wire may move within cavity 314 (shown in FIG. 3D) of release lever 304.

An opposite end of wire 360A or 360B is attached to locking assembly 126. As illustrated in FIG. 3C, rotation of release lever 304 in a direction A about pivotal connection 308 pulls wire 360A or 360B to disengage locking assembly 126. With locking assembly 126 disengaged, tilt seat frame portion 136 may tilt, or rotate, relative to base frame portion 138.

Referring to FIGS. 1A-1D, wheelchair frame 100 may be adjusted for the size of the occupant by varying the seat depth. Each back member 110 is adjustably attached to a bottom member 114 by a bracket 120. By moving bracket 120 longitudinally along the length of bottom member 114, the seat depth may be adjusted for the size of the occupant. As shown, wheelchair frame 100 comprises five back member 110 settings to accommodate a range of seat depths. For example, as shown in FIG. 1C, back member 110 is adjusted to provide a seat depth $L_1$ for a larger occupant, e.g., about 17-20 inches or about 18 inches. As shown in FIG. 1D, back member 110 is adjusted to provide a seat depth $L_2$ for a smaller occupant, e.g., about 14-17 inches or about 16 inches. Bracket 120 may be removably attached to bottom member 114 by any suitable method such as, for example, with a bolt, screw, or pin.

In addition to seat depth adjustment, a focus about which seat frame portion 136 rotates may be adjusted for the size of the occupant. As shown, roller assembly 134 of arcuate support member 122 travels along arcuate track member 118 as seat frame portion 136 tilts relative to base frame portion 138. Further, upper roller 208 and lower roller 206 mounted to roller bracket 204 guide arcuate support member 122 as it travels along arcuate track member 118. Arcuate track member 118 is generally in the form of an arc such as, for example, a circular arc or an elliptical arc, and may have a changing radius. The radius of the arc terminates in a focus such as, for example, a focal point or focal area, about which seat frame portion 136 rotates. As shown, arcuate track member 118 is elliptical and configured to minimize the vertical movement of the occupant's center of gravity while tilting seat frame portion 136. It is the Applicant's belief that a vertical movement of the occupant's center of gravity of less than about one inch over a tilt range of about 0-50 degrees results in an acceptable amount of force required to tilt seat frame portion 136.

It is preferable that the focus about which seat frame portion 136 rotates be in the vicinity of the occupant's center of gravity. If the focus is not in the vicinity of the occupant's center of gravity, the gravitational force acting on the occupant's center of gravity creates a moment that may make seat frame portion 136 more difficult to tilt. As such, substantially aligning the focus about which seat frame portion 136 rotates with the occupant's center of gravity reduces the effort required to tilt seat frame portion 136 relative to base frame portion 138. For example, the vertical movement of a smaller occupant's center of gravity while tilting seat frame portion 136 is greater than the vertical movement of a larger occupant's center of gravity. Therefore, the focus about which seat frame portion 136 rotates may be adjusted based on the size of the occupant to reduce the effort required to tilt the seat frame portion.

The focus about which seat frame portion 136 rotates may be adjusted with seat frame adjustment portion 132 and arcuate track adjustment portion 124. As stated, each arcuate track member 118 is pivotally attached to a base member 116 by a bracket at a pivot point 128. Further, track adjustment member 200 is adjustably connected to roller bracket 204 (shown in FIGS. 2A-2D), which is connected to arcuate track member 118. As such, arcuate track member 118 may be pivoted about pivot point 128 by adjusting roller bracket 204 relative to track adjustment member 200. Referring to FIGS. 2A-2D, this may be accomplished by removing a fastener (not shown) connecting track adjustment member 200 to roller bracket 204 and aligning aperture 220 in roller bracket 204 with another set of apertures 202 in track adjustment member 200. Pivoting arcuate track member 118 about pivot point 128 will move the focus of the arc about which seat frame portion 136 rotates. Both arcuate members 118 are generally pivoted the same amount and/or adjusted to the same setting or location.

The adjustment of arcuate track member 118 moves seat frame portion 136 relative to base frame portion 138. In order to maintain a proper orientation with base frame portion 138, seat frame portion 136 may need to be adjusted with seat frame adjustment portion 132. As stated, each bottom member 114 of seat frame portion 136 is pivotally attached to an arcuate support member 122 by a bracket at a pivot point 130. Further, top adjustment member 210 is connected to bottom member 114 and adjustably connected to bottom adjustment member 214 (shown in FIGS. 2C and 2D), which is connected to arcuate support member 122. As such, bottom member 114 may be pivoted about pivot point 130 by adjusting top adjustment member 210 relative to bottom adjustment member 214. Referring to FIGS. 2C and 2D, this may be accomplished by removing a fastener (not shown) connecting top adjustment member 210 to bottom adjustment member 214 and aligning aperture 212 in top adjustment member 210 with another set of apertures 216 in bottom adjustment member 214. Pivoting bottom member 114 about pivot point 130 will move seat frame portion 136 relative to base frame portion 138. Both bottom members 114 are generally pivoted the same amount and/or adjusted to the same setting or location.

Arcuate track member 118 is generally adjusted sequentially with bottom member 114 to adjust the focus about which seat frame portion 136 rotates. This adjustment process may be iterative to find a desired location of the focus for the occupant. If desired, these adjustments may also be made independently. Additionally, the tilt range may be altered such as, for example, 0 to 45 degrees or −5 to 40 degrees.

Further, arcuate track member 118 is typically pivoted in the opposite direction from bottom member 114. For example, if arcuate track member 118 is rotated clockwise, then bottom member 114 is rotated counterclockwise. This counteracting rotation ensures that seat frame portion 136 maintains the same orientation relative to base frame portion 138.

As a representative example, FIGS. 1A, 1C, 2A, and 2B depict a configuration for a large occupant such as, for example, a human weighing greater than 150 pounds. A large occupant will typically require a larger seat depth than a smaller occupant, thus shifting the occupant's center of gravity 144 rearward, e.g., a distance $X_1$ (shown in FIG. 1C) from back member 110 or about 9-10 inches or about 9.3 inches. Further, a large occupant's center of gravity 144 will typically be located further above the seating surface because of their larger stature, e.g., a distance $Y_1$ above bottom member 114 or about 12-13 inches or about 12.2 inches. The configuration shown in FIGS. 1A, 1C, 2A, and 2B places focus 140 (about which seat frame portion 136 rotates) more closely to a large occupant's center of gravity 144. As shown in FIGS. 2A and 2B, roller bracket 204 is connected to track adjustment member 200 at the highest setting or location such that the center of lower roller 206 is at a height of $H_3$ (shown in FIG. 1C), e.g., about 2-3 inches or about 2.5 inches. Further, top adjustment member 210 is connected to bottom adjustment member 214 at the lowest setting or location such that the top of bottom member 114 is at a height of $H_1$, e.g., about 3-4 inches or about 3.7 inches.

FIGS. 1B, 1D, 2C, and 2D depict a configuration for a small occupant such as, for example, a human weighing less than 100 pounds. A small occupant will typically require a smaller seat depth and have a center of gravity 146 closer to the seating surface, e.g., a distance $X_2$ (shown in FIG. 1D) from back member 110 or about 8.0 inches and a distance $Y_2$ above bottom member 114 or about 11-12 inches or about 11.5 inches. The configuration of shown in FIGS. 1B, 1D, 2C, and 2D places focus 142 more closely to a small occupant's center of gravity 146. As shown in FIGS. 2C and 2D, roller bracket 204 is connected to track adjustment member 200 at the lowest setting or location such that the center of lower roller 206 is at a height of $H_4$ (shown in FIG. 1C), e.g., about 1-2 inches or about 1.5 inches. Further, top adjustment member 210 is connected to bottom adjustment member 214 at the highest setting or location such that the top of bottom member 114 is at a height of $H_2$, e.g., about 4-5 inches or about 4.8 inches.

As shown in FIGS. 1A-1D, both seat frame adjustment portion 132 and arcuate track adjustment portion 124 include an intermediate setting or location for a mid-size occupant such as, for example, for a human weighing 100-150 pounds. However, seat frame adjustment portion 132 and/or arcuate track adjustment portion 124 may include any number of adjustment settings to achieve various desired adjustment ranges and increments. Further, adjustment portion 132 and/or arcuate track adjustment portion 124 may include an infinite adjustment mechanism, such as for example, a telescoping screw or friction lock mechanism in a continuous slot.

Figure 4:
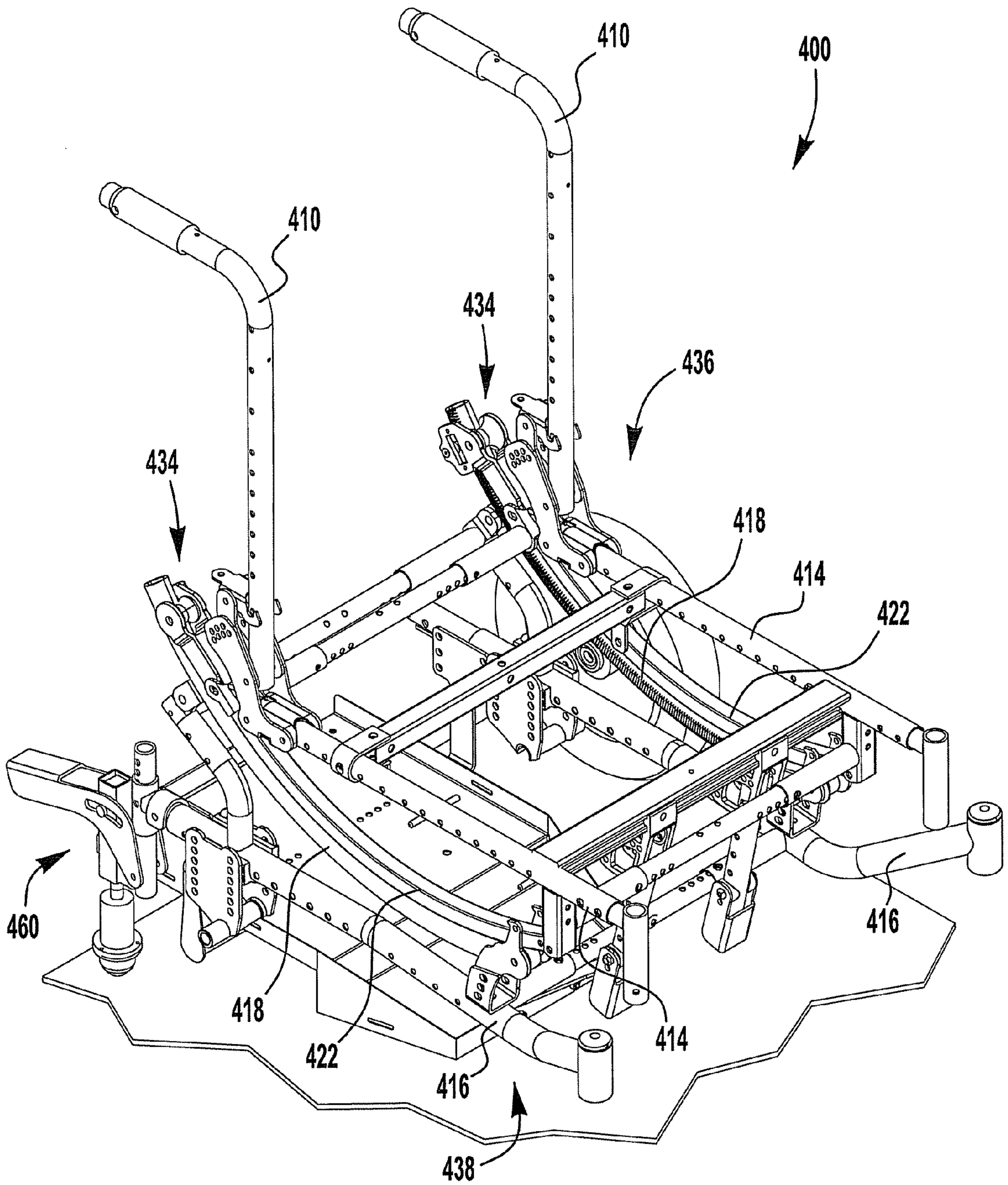
FIG. 4 is a perspective view of one embodiment of a wheelchair frame having a floor engagement mechanism.
Figure 5A:
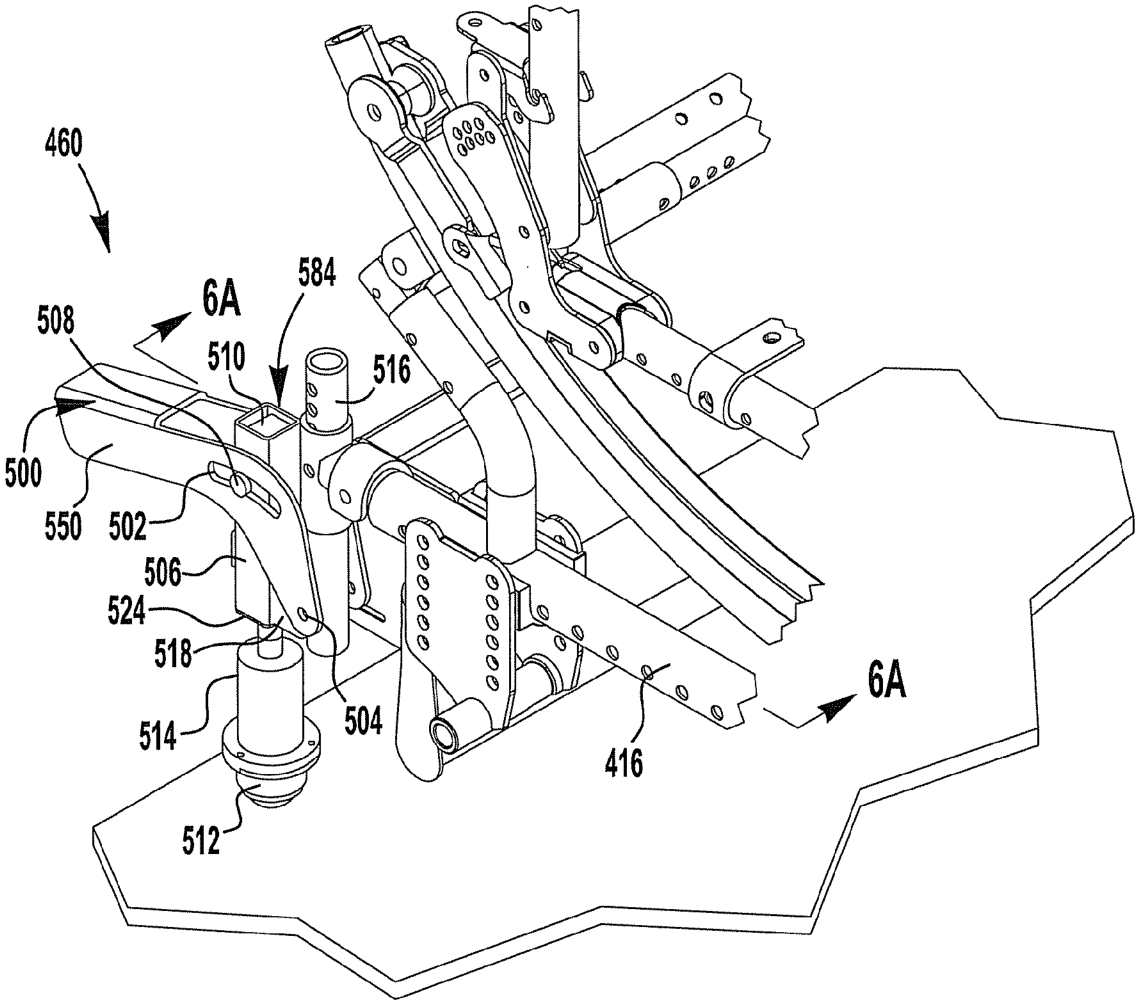
FIGS. 5A and 5B are perspective views of one embodiment of a floor engagement mechanism, as shown in FIG. 4.
Figure 5B:
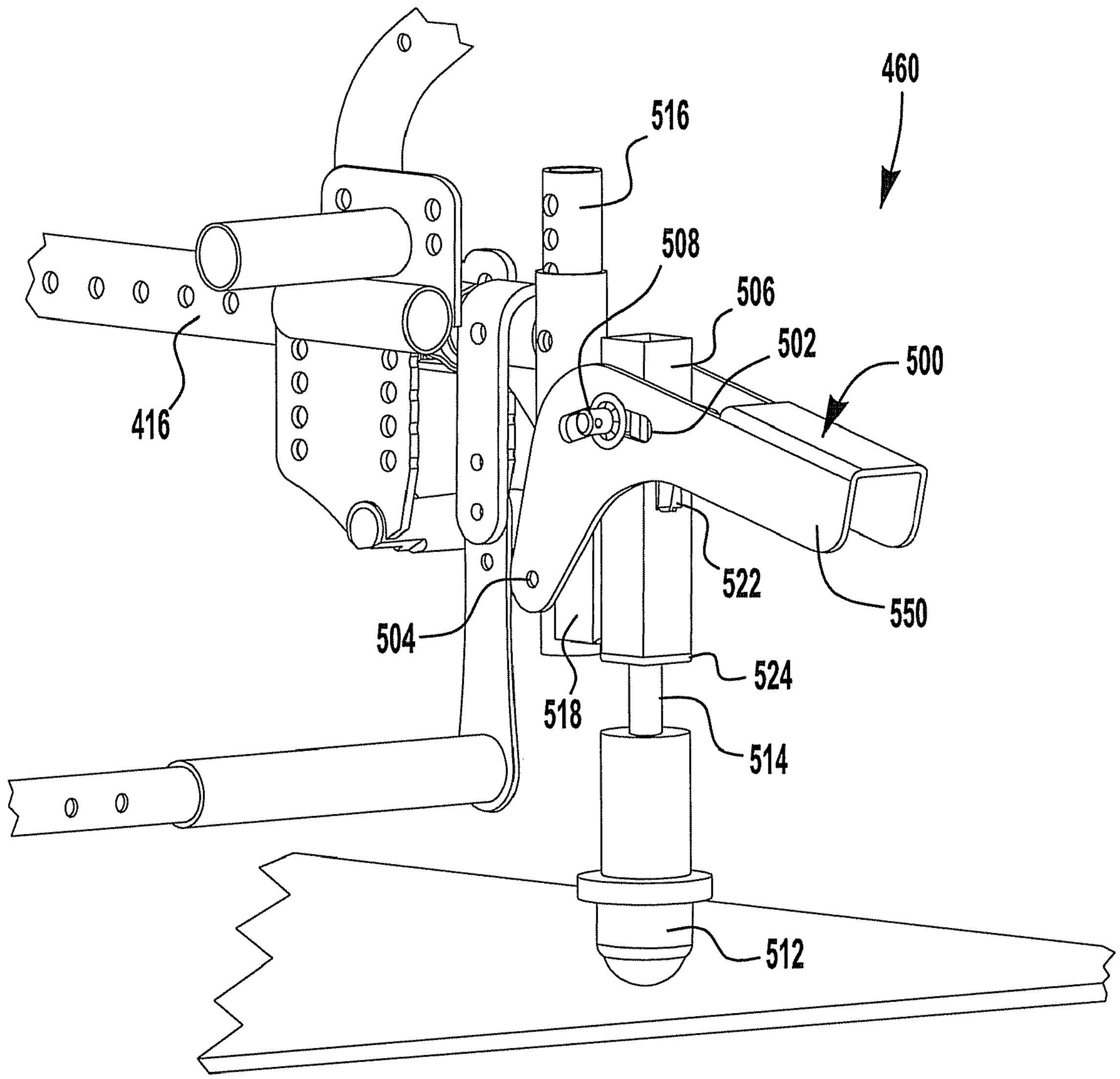
Figure 5C:
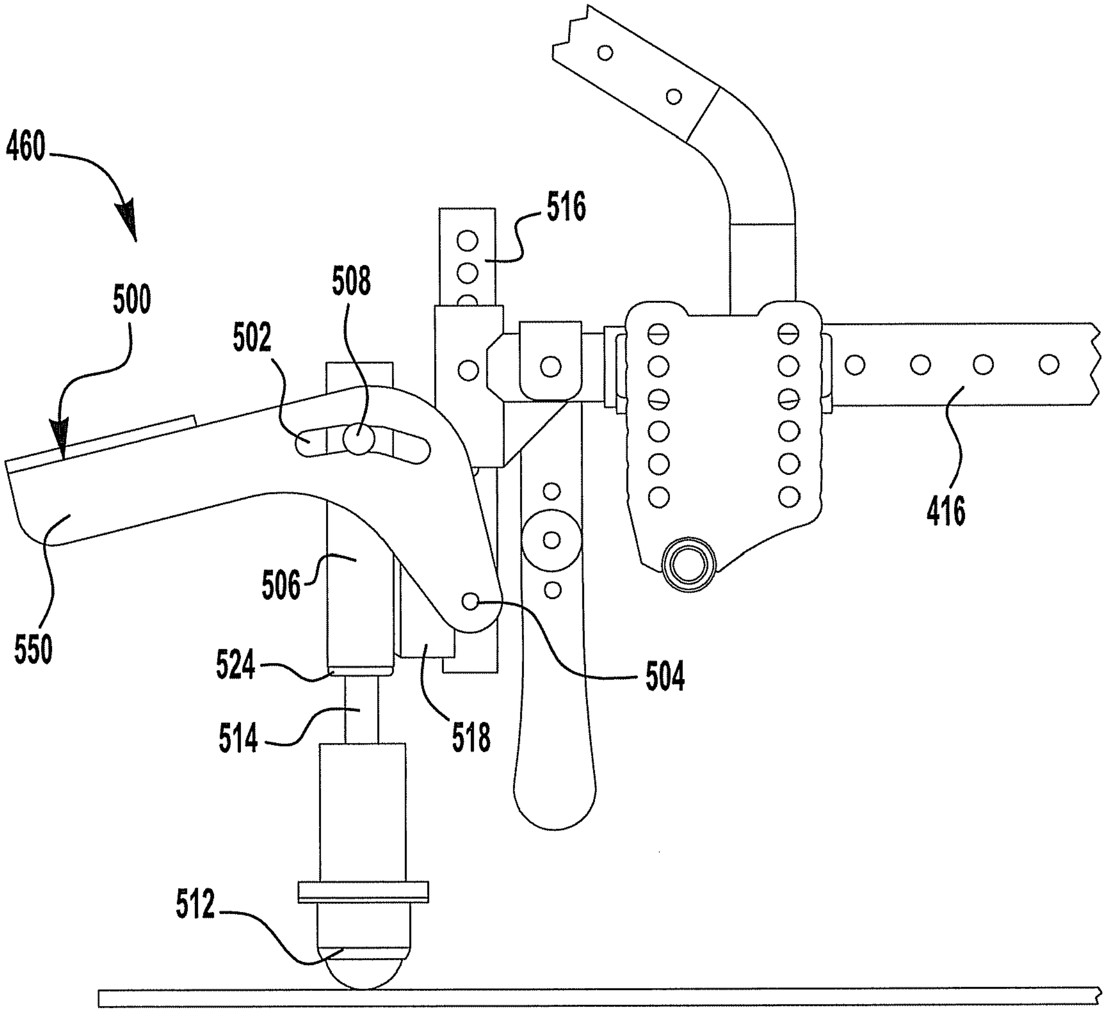
FIG. 5C is a side view of the floor engagement mechanism of FIGS. 4, 5A, and 5B.

FIG. 4 illustrates a perspective view of one embodiment of a wheelchair frame 400. Wheelchair frame 400 includes a seat frame portion 436 and a base frame portion 438. Seat frame portion 436 includes two back members 410, two bottom members 414, and two arcuate support members 422. Attached to each arcuate support member 422 is a roller assembly 434. Base frame portion 438 includes two base members 416 and two arcuate track members 418. As shown, roller assembly 434 of arcuate support member 422 travels along arcuate track member 418 as seat frame portion 436 tilts relative to base frame portion 438.

Wheelchair frame 400 further includes a floor engagement mechanism 460. Floor engagement mechanism 460 is designed to inhibit the rolling motion of the drive wheels of the wheelchair by engaging the floor or other support surface. Floor engagement mechanism 460 may at least partially lift the drive wheels of the wheelchair off the floor or other support surface. Further, floor engagement mechanism 460 may be configured to allow the wheelchair to be rolled in a direction not limited by the drive wheels. An exemplary floor engagement mechanism is described in U.S. patent application Ser. No. 12/246,634, filed Oct. 7, 2008 and entitled "Latching Motion Transfer Mechanism," which is incorporated herein by reference in its entirety.

FIGS. 5A-6B illustrate various views of floor engagement mechanism 460 of wheelchair frame 400. Floor engagement mechanism 460 includes a frame 506, a first catch 522, a second catch 660, a plunger 514, a biasing member 602, a drive member 510, a detent member 600, a pin and follower mechanism 500, an adjustment member 516, a rolling element 512, and a spacing block 518. Frame 506 includes a channel 584 with at least first and second spaced apart walls. The channel may take a wide variety of different forms. In the illustrated embodiment, channel 584 is straight. However, the channel may be curved or the channel may have one or more straight and/or curved portions. The walls of the channel are illustrated as being parallel to one another. However, the walls may be non-parallel such that spacing between the walls varies along the length of the channel.

Figure 6A:
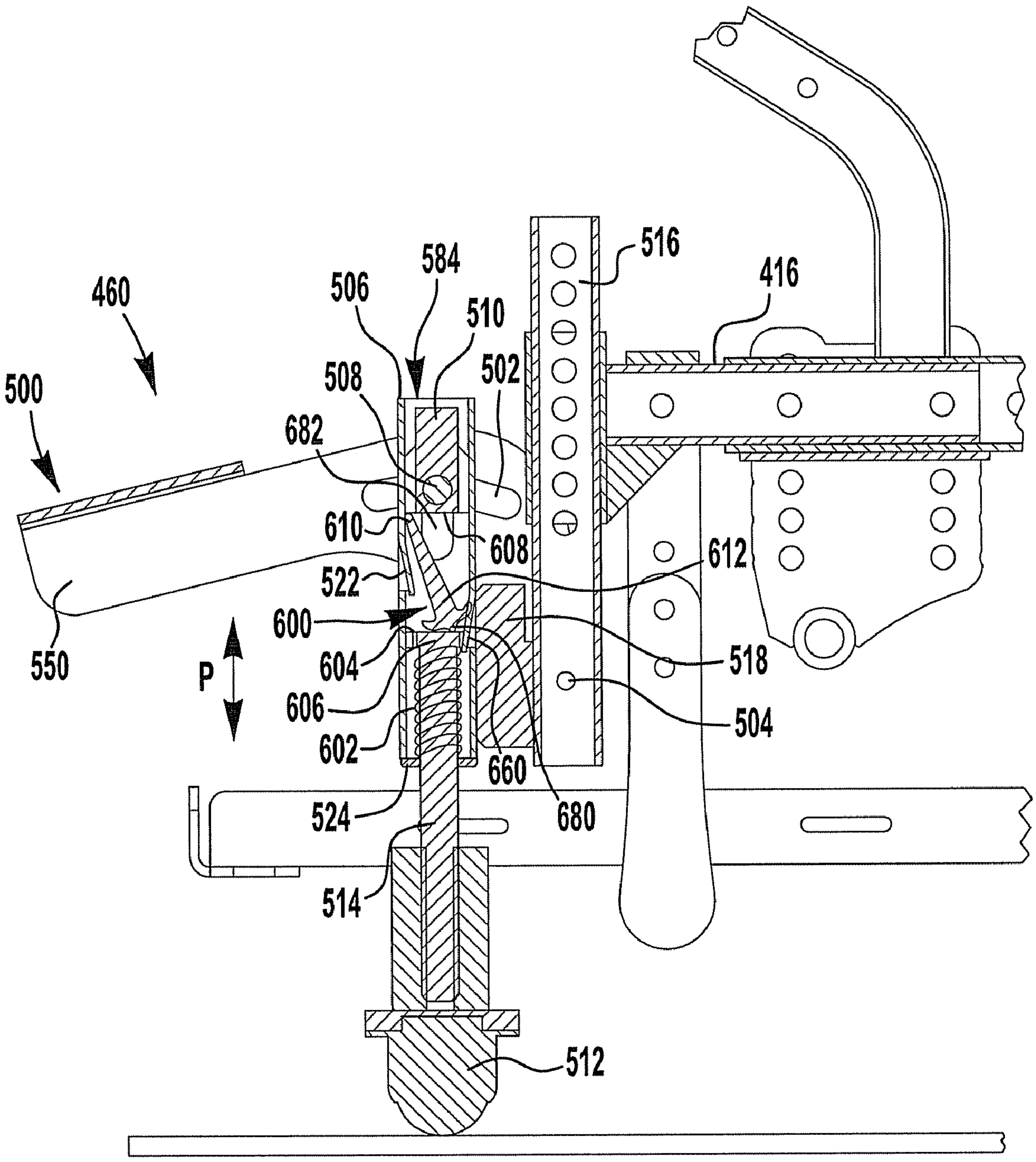
FIG. 6A is a cross sectional view of the floor engagement mechanism of FIGS. 4 and 5A-5C.
Figure 6B:
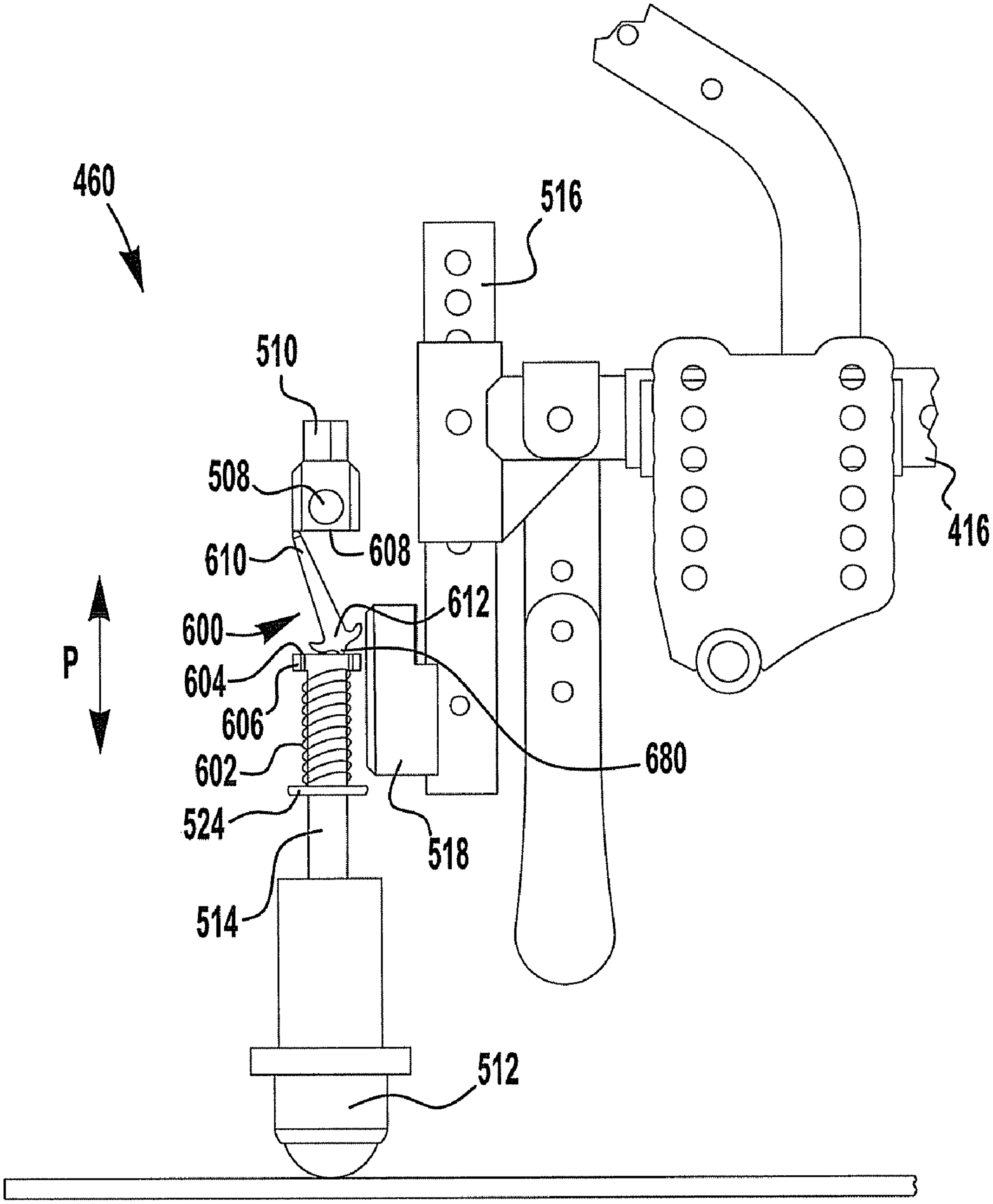
FIG. 6B is a side view of the floor engagement mechanism of FIGS. 4, 5A-5C, and 6A with frame and pivot arm members removed.
Figure 7A:
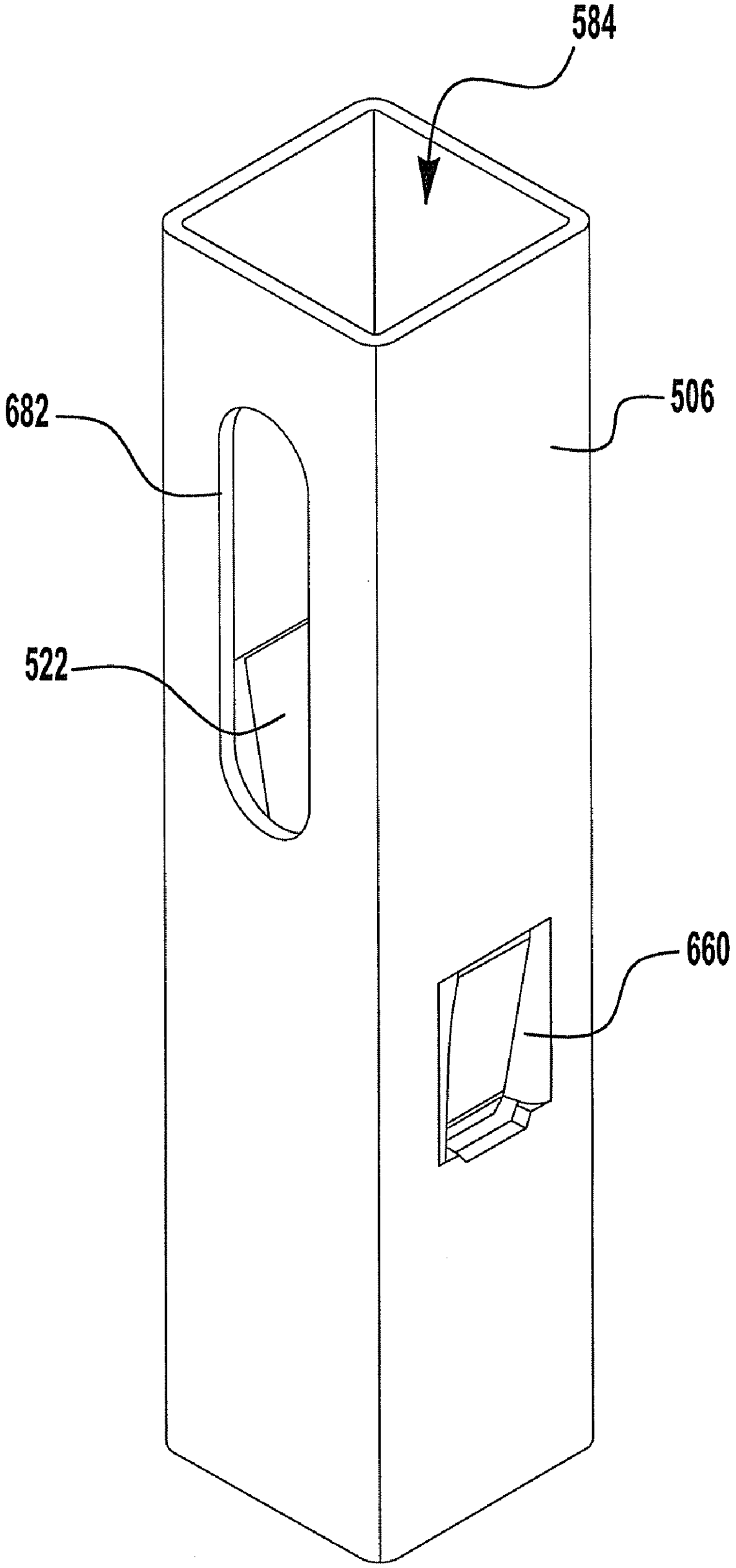
FIGS. 7A and 7B are perspective views of one embodiment of the frame of the floor engagement mechanism of FIGS. 4, 5A, and 5B.
Figure 7B:
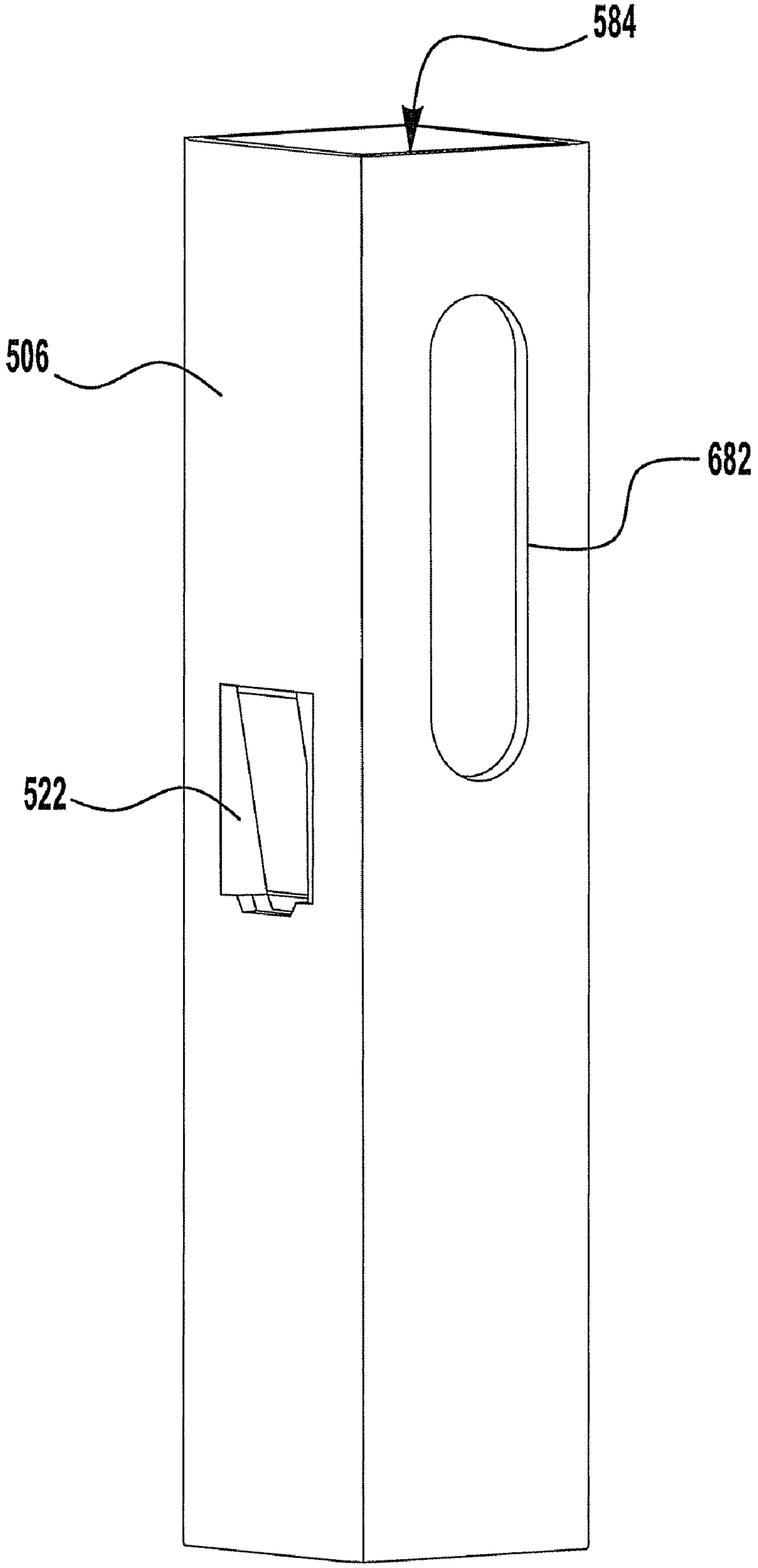

As shown in FIG. 6A, first catch 522 extends from the first side wall into channel 584 at a first position along a length of the channel. Second catch 660 extends from the second side wall into channel 584 at a second position along the length of the channel. Catches 522, 660 may take a wide variety of different forms. For example, either catch may be a portion of the channel wall that is bent into the channel, may be a projection that extends into the channel from the wall, may be a member that is attached to the channel wall, and/or may be a recess in the wall, instead of a projection that extends from the wall. Each catch may be any physical arrangement that is configured to latch with a second member. Other exemplary latch configurations may be found in U.S. patent application Ser. No. 12/246,634, filed Oct. 7, 2008 and entitled "Latching Motion Transfer Mechanism," which is incorporated herein by reference in its entirety.

Plunger 514 is disposed in channel 584. Plunger 514 is a generally circular member having a generally rectangular head portion 606 with a detent member slide surface 604 and notches that allow the head portion to move past catches 522, 660 extending from the side walls into the channel 584. Slide surface 604 is transverse to a path of travel P (FIGS. 6A and 6B) formed by channel 584. Plunger 514 may take a wide variety of different forms. Any configuration that is able to move along the path of travel P may be used. Slide surface 604 may be configured in any manner that allows a surface of detent member 600 to slide between the side walls of channel 584. Other exemplary plunger configurations may be found in U.S. patent application Ser. No. 12/246,634, filed Oct. 7, 2008 and entitled "Latching Motion Transfer Mechanism," which is incorporated herein by reference in its entirety.

Rolling element 512 is removably attached to an engagement end of plunger 514. Rolling element 512 is designed to engage the floor or other support surface and allow the wheelchair to roll, or slide, in a direction not limited by the drive wheels. As plunger 514 is forced downward, rolling element 512 engages the floor and may at least partially lift the wheels of the wheelchair off the floor. Rolling element 512 may be any suitable rolling or sliding element such as, for example, a swivel caster, a rolling ball, a wheel, a rounded cap, or the like. As shown in FIG. 6A, rolling element 512 is configured as a cap having a rounded surface that engages the floor.

In some embodiments, a foot, or base, having a surface (e.g., a planar, rounded, or friction surface) is removably attached to the engagement end of the plunger. The foot contacts the floor or other support surface and inhibits the rolling motion of the wheelchair. The foot may also at least partially lift the wheels (e.g., the drive wheels) of the wheelchair off the floor or other support surface.

As shown in FIG. 6A, biasing member 602 is coupled to plunger 514 such that plunger 514 is urged upward along the path of travel P toward first catch 522 and/or second catch 660. Biasing member 602 may take a wide variety of different forms and may be coupled to plunger 514 in a wide variety of different ways. As shown, biasing member 602 is a spring disposed around plunger 514. Biasing member 602 is disposed between head portion 606 of plunger 514 and an end wall 524 of frame 506. The biasing member may be any structure in any configuration that imparts an upward reaction force on plunger 514 toward first catch 522 and/or second catch 660 when plunger 514 is moved in channel 584 toward end wall 524. Other exemplary biasing member configurations may be found in U.S. patent application Ser. No. 12/246,634, filed Oct. 7, 2008 and entitled "Latching Motion Transfer Mechanism," which is incorporated herein by reference in its entirety.

Drive member 510 is at least partially disposed in channel 584. The portion of drive member 510 that is disposed in channel 584 is moveable along the path of travel P. Drive member 510 is a generally rectangular member having a detent member slide surface 608. Slide surface 608 is transverse to a path of travel P formed by channel 584. Drive member 510 may take a wide variety of different forms. Any configuration that is able to move along the path of travel P may be used. Slide surface 608 may be configured in any manner that allows a surface of detent member 600 to slide between the side walls of channel 584 may be used. Other exemplary drive member configurations may be found in U.S. patent application Ser. No. 12/246,634, filed Oct. 7, 2008 and entitled "Latching Motion Transfer Mechanism," which is incorporated herein by reference in its entirety.

As shown in FIG. 6A, detent member 600 is disposed in channel 584 between drive member 510 and plunger 514. Detent member 600 may take a wide variety of different forms. Detent member 600 may take any form that transfers motion of drive member 510 to plunger 514 and selectively latches and disengages from first catch 522 and second catch 660. Detent member 600 includes a leg portion 610 in contact with drive member 510 and a latch portion 612 in contact with plunger 514. Latch portion 612 has first and second latch projections extending from opposite sides of detent member 600. An optional pivot protrusion 680 also extends from latch portion 612 in a direction away from leg portion 610. Latch portion 612 is configured to slide across slide surface 604 between the side walls of channel 584 such that the first latch projection can latch with first catch 522 and the second latch projection can latch with second catch 660. As shown, the pivot protrusion is rounded to ease sliding of the latch portion 612 across slide surface 604. An end portion of leg portion 610 is moveable between the first and second walls of channel 584 to allow latch portion 612 to disengage from said first and second catches 522, 660. As shown, the end portion is rounded to ease sliding of the end portion across slide surface 608 between the side walls. Other exemplary detent member configurations may be found in U.S. patent application Ser. No. 12/246,634, filed Oct. 7, 2008 and entitled "Latching Motion Transfer Mechanism," which is incorporated herein by reference in its entirety.

Drive member 510 may be moved or driven in a wide variety of different ways. The drive member may be moved or driven directly, or indirectly, and by a powered or manual mechanism. Any mechanism may be used to move drive member 510. As shown in FIGS. 5A-6A, drive member 510 is moved by a pin and follower mechanism 500. Pin and follower mechanism 500 includes a pin 508 that is connected to drive member 510 and a pivot arm 550 that is pivotally connected to adjustment member 516 at a pivot connection 504. Pin 508 extends through a slot 682 in frame 506 and a slot 502 in pivot arm 550. Slot 682 through frame 506 allows pin 508 to move with drive member 510 along the path of travel P. Edges of slot 682 engage pin 508 when pivot arm 550 is pivoted about pivotal connection 504 to move pin 508 and drive member 510 along the path of travel. Other exemplary methods and configurations of moving, or driving, the drive member may be found in U.S. patent application Ser. No. 12/246,634, filed Oct. 7, 2008 and entitled "Latching Motion Transfer Mechanism," which is incorporated herein by reference in its entirety.

The shape of slot 502 in pivot arm 550 defines the movement of pin 508 as pivot arm 550 is pivoted. Slot 502 may be shaped to accommodate a wide variety of different applications. For example, slot 502 may be configured to provide a variable actuation speed and force. Slot 502 governs the position of follower pin 508 relative to pivot connection 504, which in turn determines, at any given point, the instantaneous ratio of pivot arm 550 speed to pin 508 speed and also the amount of mechanical advantage (i.e., potential lifting force to raise the wheelchair). The shape of slot 502 may also be optimized to reduce the amount of travel of pivot arm 550. The travel of pivot arm 550 can be configured to accommodate a wide variety of different applications. Pivot arm 550 may initially be positioned at a horizontal position at the top of the stroke and then rotate downward. Pivot arm 550 may also be initially positioned above horizontal at the top of the stroke and then pivot downward. Other exemplary configurations may be found in U.S. patent application Ser. No. 12/246,634, filed Oct. 7, 2008 and entitled "Latching Motion Transfer Mechanism," which is incorporated herein by reference in its entirety.

Frame 506 is adjustably connected to base member 416 via spacing block 518 and adjustment member 516. Adjustment member 516 extends vertically through a tubular portion of base member 416 and is adjustably connected to the tubular portion. The tubular portion includes at least one aperture designed to substantially align with apertures in adjustment member 516 such that adjustment member 516 may be connected with a fastener (not shown) to base member 416 in various positions. Any suitable removable fastener such as, for example, a pin, a bolt, or a screw, may be used to connect adjustment member 516 to base member 416. Spacing block 518 is attached to a lower portion of adjustment member 516 and frame 506. As such, frame 506 is adjustably connected to base member 416 and may be positioned at various locations or settings relative to base member 416. As shown in FIG. 6A, the length of base member 416 may also be adjustable and secured with a fastener (not shown) in various positions.

Figure 8:
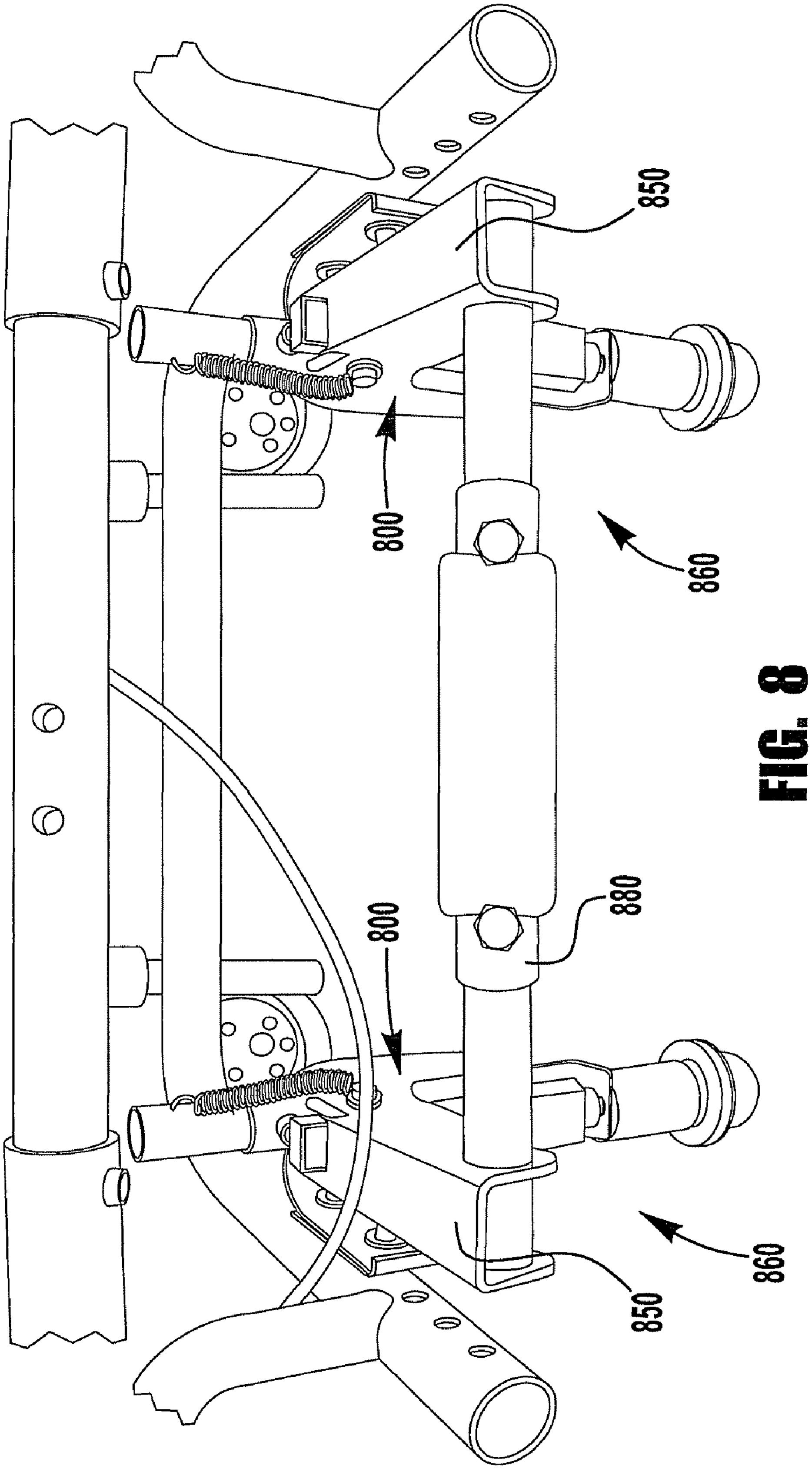
FIG. 8 is a photograph of a member used to operate two floor engagement mechanisms.

FIG. 8 illustrates an example of a single member 880 that can be used to operate two floor engagement mechanisms 860. Member 880 may be configured to accommodate a wide variety of different applications. For example, as shown, member 880 is configured to be engaged by an operator's foot. By stepping on member 880, the operator may operate floor engagement mechanisms 860 to lift the wheels of the wheelchair off of the support surface. The illustrated member 880 is an elongated bar that is attached to two pivot arms 850 of two pin and follower mechanisms 800 to drive pin and follower mechanisms 800 at the same time. By connecting member 880 to pivot arms 850, the movement of the pins and the drive members are substantially coupled together. Further, member 880 may be adjustable and removable from pivot arms 850. Other exemplary configurations may be found in U.S. patent application Ser. No. 12/246,634, filed Oct. 7, 2008 and entitled "Latching Motion Transfer Mechanism," which is incorporated herein by reference in its entirety.

As shown in FIG. 6A, floor engagement mechanism 460 is in transition between a retracted position and an extended position with rolling element 512 in contact with the support surface. In the extended position, the second latch projection is in engagement with second catch 660. Biasing member 602 urges the second latch projection against second catch 660 to inhibit the second latch projection from disengaging from second catch 660. The engagement of the second latch projection with second catch 660 inhibits further movement of plunger 514 and drive member 510.

As the operator applies a force downward on drive member 510, detent member 600 and plunger 514 are moved downward such that the second latch projection disengages from second catch 660. As the operator continues to apply the downward force on drive member 510, latch portion 612 slides across slide surface 604 of plunger 514 toward the first side wall of channel 584. As the operator suspends the downward force on drive member 510, biasing member 602 forces plunger 514 and detent member 600 upward until the first latch projection engages first catch 522. Detent member 600 then pivots and leg portion 610 moves across slide surface 608 of drive member 510 towards the second side wall of channel 702. In this position, floor engagement mechanism 460 is in the retracted position and rolling element 512 is longer in contact with the support surface. Biasing member 602 urges the first latch projection against first catch 522 to inhibit the first latch projection from disengaging from first catch 522. The engagement of the first latch projection with first catch 522 inhibits further movement of plunger 514 and drive member 510.

Similarly, as the operator applies a force downward on drive member 510, detent member 600 and plunger 514 are moved downward such that the first latch projection disengages from first catch 522. As the operator continues to apply the downward force on drive member 510, latch portion 612 slides across slide surface 604 of plunger 514 toward the second side wall of channel 584. The operator continues to apply the downward force until the second latch mechanism is below second catch 660. As the operator suspends the downward force on drive member 510, biasing member 602 forces plunger 514 and detent member 600 upward until the second latch projection engages second catch 660. Detent member 600 then pivots and leg portion 610 moves across slide surface 608 of drive member 510 towards the first side wall of channel 584. In this position, the floor engagement mechanism 460 is again in the extended position. Further discussion related to the operation of an exemplary floor engagement mechanism can be found in U.S. patent application Ser. No. 12/246,634, filed Oct. 7, 2008 and entitled "Latching Motion Transfer Mechanism," which is incorporated herein by reference in its entirety.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

We claim:

1. A wheelchair, comprising:

a seat frame portion having a bottom member and an arcuate support member attached to the bottom member by a first pivotal attachment and by a seat frame adjustment portion, wherein the seat frame adjustment portion allows for pivotal adjustment of the bottom member about the first pivotal attachment relative to the arcuate support member; and a base frame portion having a base member and an arcuate track member attached to the base member by a second pivotal attachment and by an arcuate track adjustment portion, wherein the arcuate track adjustment portion allows for pivotal adjustment of the arcuate track member about the second pivotal attachment relative to the base member, wherein the arcuate track member is coupled to the arcuate support member to allow the seat frame portion to tilt relative to the base frame portion.

2. The wheelchair of claim 1, wherein the arcuate track adjustment portion permits pivotal adjustment of focus about which the seat frame portion rotates.

3. The wheelchair of claim 2, wherein the seat frame adjustment portion permits pivotal adjustment of the seat frame portion relative to the base frame portion to adjust the orientation of the bottom member relative to the arcuate track member.

4. The wheelchair of claim 1 further comprising a roller assembly and a locking assembly attached to the arcuate support member and a tilt release assembly attached to a handle of the seat frame portion, wherein: the tilt release assembly comprises a lever block and a release lever pivotally connected to the lever block; the release lever is operatively connected by a cable to the locking assembly; and the cable is configured to transmit a force applied to the release lever to release the locking assembly such that the seat frame portion may tilt relative to the base frame portion.

5. The wheelchair of claim 4, wherein the lever block comprises a first opening and second opening for attachment of the cable to the release lever, wherein the first opening is located at a front portion of the tilt release assembly and the second opening is located at a bottom portion of the tilt release assembly.

6. The wheelchair of claim 4, wherein the cable is attached to the release lever at a bottom portion of the tilt release assembly such that the cable may be attached to the locking assembly without bending.

7. The wheelchair of claim 1, wherein the arcuate track member is elliptical and configured to minimize vertical movement of the patient's center of gravity while tilting the seat frame portion relative to the base frame portion.

8. The wheelchair of claim 1, wherein the seat frame portion further comprises a back member adjustably attached to the bottom member to permit horizontal adjustment of the patient's center of gravity relative to the bottom member.

9. The wheelchair of claim 1, wherein a roller assembly attached to the arcuate support member travels along the arcuate track member as the seat frame portion tilts relative to the base frame portion, and wherein an upper and lower roller mounted to a roller bracket guide the arcuate support member as the arcuate support member travels along the arcuate track member.

10. The wheelchair of claim 9, wherein the arcuate track adjustment portion comprises a track adjustment member attached to the base member and adjustably connected to the roller bracket such that the arcuate track member may be pivoted about the second pivotal attachment relative to the base member by adjusting the roller bracket relative to the track adjustment member.

11. The wheelchair of claim 10, wherein the roller bracket is adjusted relative to the track adjustment member by aligning an aperture in the roller bracket with a set of apertures in the track adjustment member and connecting the track adjustment member to the roller bracket with a fastener.

12. The wheelchair of claim 1, wherein the seat frame adjustment portion comprises a top adjustment member adjustably connected to a bottom adjustment member, wherein the top adjustment member is connected to the bottom member and the bottom adjustment member is connected to the arcuate support member, and wherein the bottom member may be pivoted about the first pivotal attachment relative to the arcuate support member by adjusting the top adjustment member relative to the bottom adjustment member.

13. The wheelchair of claim 12, wherein the top adjustment member is adjusted relative to the bottom adjustment member by aligning an aperture in the top adjustment member with a set of apertures in the bottom adjustment member and connecting the top adjustment member to the bottom adjustment member with a fastener.

14. The wheelchair of claim 1, wherein the arcuate track adjustment portion is configured to permit at least about 1 inch of pivotal adjustment of the arcuate track member about the second pivotal attachment relative to the base member.

15. The wheelchair of claim 1, wherein the seat frame adjustment portion is configured to permit at least about 1.1 inches of pivotal adjustment of the bottom member about the first pivotal attachment relative to the arcuate support member.

16. The wheelchair of claim 1, wherein at least one of the arcuate track adjustment portion and the seat frame adjustment portion comprises multiple adjustment settings to achieve various desired adjustment ranges and increments.

17. The wheelchair of claim 1, wherein at least one of the arcuate track adjustment portion and the seat frame adjustment portion comprises a continuous adjustment mechanism.

18. The wheelchair of claim 1 further comprising a floor engagement mechanism attached to the base frame portion, wherein the floor engagement mechanism is configured to selectively engage a support surface to inhibit the rolling motion of a set of drive wheels of the wheelchair.

19. The wheelchair of claim 18, wherein the floor engagement mechanism is configured to at least partially lift the drive wheels of the wheelchair off the support surface.

20. The wheelchair of claim 18, wherein the floor engagement mechanism is configured to permit the wheelchair to be rolled in a direction not limited by the drive wheels.

21. A wheelchair, comprising:

a seat frame portion having a bottom member, a back member adjustably attached to the bottom member, and an arcuate support member attached to the bottom member by a first pivotal attachment and by a seat frame adjustment portion, wherein the seat frame adjustment portion allows for pivotal adjustment of the bottom member about the first pivotal attachment relative to the arcuate support member, and wherein a roller assembly and a locking assembly are attached to the arcuate support member;

a base frame portion having a base member and an arcuate track member attached to the base member by a second pivotal attachment and by an arcuate track adjustment portion, wherein the arcuate track adjustment portion allows for pivotal adjustment of the arcuate track member about the second pivotal attachment relative to the base member, and wherein: the seat frame portion is configured to tilt relative to the base frame portion; the arcuate track adjustment portion permits pivotal adjustment of a focus about which the seat frame portion rotates; and the seat frame adjustment portion permits pivotal adjustment of the seat frame portion relative to the base frame portion to adjust the orientation of the bottom member relative to the arcuate track member; and a tilt release assembly attached to the back member, wherein: the tilt release assembly comprises a lever block and a release lever pivotally connected to the lever block; the release lever is operatively connected by a cable to the locking assembly; the cable is configured to transmit a force applied to the release lever to release the locking assembly such that the seat frame portion may tilt relative to the base frame portion; and the cable is attached to the release lever at a bottom portion of the tilt release assembly such that the cable may be attached to the locking assembly without bending.

22. A method of adjusting a wheelchair, comprising the steps of:

providing a wheelchair having a seat frame portion configured to tilt relative to a base frame portion of the wheelchair;

adjusting a focus about which the seat frame portion rotates by pivoting an arcuate track member of the base frame portion about a second pivotal attachment relative to a base member of the base frame portion; and adjusting the seat frame portion relative to the base frame portion by pivoting a bottom member of the seat frame portion about a first pivotal attachment relative to an arcuate support member of the seat frame portion.

23. The method of claim 22, wherein the arcuate track member is attached to the base member by the second pivotal attachment and by an arcuate track adjustment portion, wherein the arcuate track adjustment portion allows for pivotal adjustment of the arcuate track member about the second pivotal attachment relative to the base member, and wherein the arcuate track adjustment portion permits pivotal adjustment of the focus about which the seat frame portion rotates.

24. The method of claim 22, wherein the the arcuate support member is attached to the bottom member by the first pivotal attachment and by a seat frame adjustment portion, wherein the seat frame adjustment portion allows for pivotal adjustment of the bottom member about the first pivotal attachment relative to the arcuate support member, and wherein the seat frame adjustment portion permits pivotal adjustment of the seat frame portion relative to the base frame portion.

25. The method of claim 22, wherein the focus is adjusted sequentially with the seat frame portion.

26. The method of claim 22 further comprising adjusting the seat depth of the wheelchair by moving a back member of the seat frame portion relative to the bottom member of the seat frame portion.

27. The method of claim 22, wherein the arcuate track member is pivoted in an opposite direction from the bottom member.

28. A wheelchair, comprising:

a base frame portion comprising a track member; and a seat frame portion configured to tilt relative to the base frame portion, wherein the seat frame portion comprises a bottom member attached to an arcuate member by a seat frame adjustment portion that permits pivotal adjustment of the bottom member relative to arcuate member, and wherein the arcuate member is operatively coupled to the track member of the base frame portion such that the arcuate member travels along the track member as the seat frame portion tilts relative to the base frame portion.

29. The wheelchair of claim 28, wherein the track member is attached to a base member of the base frame portion by a track adjustment portion that permits pivotal adjustment of the track member relative to the base member.

30. A method of adjusting a wheelchair, comprising the steps of:

providing a wheelchair having a seat frame portion configured to tilt relative to a base frame portion of the wheelchair;

adjusting a focus about which the seat frame portion rotates; and adjusting the seat frame portion relative to the base frame portion by pivoting a bottom member of the seat frame portion relative to an arcuate member of the seat frame portion.

31. The method of claim 30, wherein the arcuate member is attached to the bottom member by a seat frame adjustment portion that permits pivotal adjustment of the bottom member relative to arcuate member.

* * * * *